US010996542B2

(12) United States Patent
Kostrzewa et al.

(10) Patent No.: US 10,996,542 B2
(45) Date of Patent: May 4, 2021

(54) INFRARED IMAGING SYSTEM SHUTTER ASSEMBLY WITH INTEGRATED THERMISTER

(71) Applicant: FLIR Systems, Inc., Wilsonville, OR (US)

(72) Inventors: Joseph Kostrzewa, Santa Ynez, CA (US); Bruce A. Covington, Santa Barbara, CA (US); Marcel Tremblay, Goleta, CA (US); Theodore R. Hoelter, Santa Barbara, CA (US); Pierre M. Boulanger, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/511,365

(22) Filed: Jul. 15, 2019

(65) Prior Publication Data
US 2019/0339589 A1 Nov. 7, 2019

Related U.S. Application Data

(63) Continuation of application No. PCT/US2018/015590, filed on Jan. 26, 2018, which
(Continued)

(51) Int. Cl.
*G03B 9/08* (2021.01)
*G03B 7/22* (2021.01)
(Continued)

(52) U.S. Cl.
CPC ............... *G03B 9/08* (2013.01); *G03B 7/22* (2013.01); *H04N 5/2254* (2013.01); *G03B 9/58* (2013.01)

(58) Field of Classification Search
None
See application file for complete search history.

(56) References Cited

U.S. PATENT DOCUMENTS 4,636,091 A * 1/1987 Pompei ............... G01J 5/02
250/342
4,967,081 A 10/1990 Quad et al.
(Continued)

FOREIGN PATENT DOCUMENTS

EP 0398725 11/1990
EP 0837600 4/1998
(Continued)

OTHER PUBLICATIONS

Search Report, Google.*

*Primary Examiner* — Mohammad J Rahman
(74) *Attorney, Agent, or Firm* — Haynes and Boone, LLP

(57) ABSTRACT

An infrared imaging system is provided with a shutter assembly having an integrated thermistor. In one example, a device includes a shutter assembly. The shutter assembly includes a paddle configured to move between an open position and a closed position. The paddle is configured to block external infrared radiation from reaching a focal plane array (FPA) in a closed position, and pass the external infrared radiation to the FPA in an open position. The shutter assembly also includes an embedded thermistor configured to sense a temperature of the paddle when the paddle is in the open position. In another example, an infrared sensor assembly includes a first set of mechanically engageable electrical contacts for engaging with a second set of mechanically engageable electrical contacts of a shutter assembly electrically coupled with a thermistor through a conductive path. Additional devices and related methods are also provided.

20 Claims, 18 Drawing Sheets

FIG. 7B

Related U.S. Application Data is a continuation-in-part of application No. 14/747,865, filed on Jun. 23, 2015, now Pat. No. 10,389,953, which is a continuation of application No. PCT/US2013/078551, filed on Dec. 31, 2013, which is a continuation-in-part of application No. 13/966,052, filed on Aug. 13, 2013, now Pat. No. 9,473,681, said application No. 14/747,865 is a continuation-in-part of application No. 13/966,052, filed on Aug. 13, 2013, now Pat. No. 9,473,681.

(60) Provisional application No. 62/476,606, filed on Mar. 24, 2017, provisional application No. 62/451,631, filed on Jan. 27, 2017, provisional application No. 61/747,789, filed on Dec. 31, 2012.

(51) Int. Cl.
*H04N 5/225* (2006.01)
*G03B 9/58* (2021.01)

(56) References Cited

U.S. PATENT DOCUMENTS

| | | | | |
|---|---|---|---|---|
| 5,054,936 A * | 10/1991 | Fraden | | G01J 5/061 374/164 |
| 5,128,796 A | 7/1992 | Barney et al. | | |
| 5,199,884 A | 4/1993 | Kaufman et al. | | |
| 5,331,124 A * | 7/1994 | Danielson | | B60Q 5/003 200/61.54 |
| RE34,789 E * | 11/1994 | Fraden | | G01J 5/0022 374/133 |
| 5,670,248 A * | 9/1997 | Lazarov | | C23C 30/00 428/304.4 |
| 6,297,794 B1 | 10/2001 | Tsubouchi et al. | | |
| 6,330,371 B1 | 12/2001 | Chen et al. | | |
| 6,435,711 B1 | 8/2002 | Gerlitz | | |
| 6,683,298 B1 * | 1/2004 | Hunter | | G02B 7/022 250/208.1 |
| 6,707,044 B2 | 3/2004 | Lannestedt et al. | | |
| 6,883,054 B2 | 4/2005 | Yamaguchi et al. | | |
| 7,470,902 B1 | 12/2008 | Kraemer et al. | | |
| 7,575,077 B2 | 8/2009 | Priepke et al. | | |
| 7,616,877 B2 | 11/2009 | Zarnowski et al. | | |
| 7,671,321 B2 * | 3/2010 | Perlman | | H04N 5/357 250/216 |
| 8,049,163 B1 | 11/2011 | Granneman et al. | | |
| 8,153,980 B1 | 4/2012 | Brady et al. | | |
| 8,274,050 B2 | 9/2012 | Grimberg | | |
| 8,373,757 B1 | 2/2013 | Nguyen | | |
| 9,473,681 B2 | 10/2016 | Hoelter et al. | | |
| 10,389,953 B2 | 8/2019 | Hoelter et al. | | |
| 2002/0058352 A1 | 5/2002 | Jacksen et al. | | |
| 2002/0162963 A1 | 11/2002 | Lannestedt et al. | | |
| 2004/0151229 A1 | 8/2004 | Ruettiger | | |
| 2004/0188617 A1 * | 9/2004 | Devitt | | G01J 1/42 250/338.1 |
| 2004/0200632 A1 | 10/2004 | Kanai | | |
| 2004/0211907 A1 | 10/2004 | Wellman et al. | | |
| 2006/0040478 A1 | 2/2006 | Merkl et al. | | |
| 2006/0081777 A1 | 4/2006 | Bevan et al. | | |
| 2006/0097172 A1 | 5/2006 | Park | | |
| 2006/0219940 A1 * | 10/2006 | Pemberton | | G03B 9/16 250/472.1 |
| 2008/0159478 A1 * | 7/2008 | Keall | | A61N 5/1042 378/65 |
| 2008/0210872 A1 * | 9/2008 | Grimberg | | G01J 5/0834 250/339.04 |
| 2008/0259181 A1 | 10/2008 | Yamashita et al. | | |
| 2009/0093687 A1 | 4/2009 | Telfort et al. | | |
| 2009/0096994 A1 * | 4/2009 | Smits | | G01B 11/14 353/30 |
| 2009/0303363 A1 | 12/2009 | Blessinger | | |
| 2010/0012904 A1 * | 1/2010 | Kariis | | F41H 3/00 252/519.33 |
| 2010/0020229 A1 | 1/2010 | Hershey et al. | | |
| 2010/0021657 A1 | 1/2010 | Lochtman et al. | | |
| 2010/0030506 A1 * | 2/2010 | Cairnduff | | H04N 5/3651 702/104 |
| 2010/0046577 A1 | 2/2010 | Sheard et al. | | |
| 2010/0097519 A1 | 4/2010 | Byrne et al. | | |
| 2010/0101924 A1 * | 4/2010 | Wu | | H01H 9/0271 200/339 |
| 2010/0220212 A1 * | 9/2010 | Perlman | | H04N 5/3572 348/229.1 |
| 2010/0309315 A1 | 12/2010 | Hogasten et al. | | |
| 2011/0108717 A1 * | 5/2011 | Olson | | H04N 5/33 250/252.1 |
| 2011/0221599 A1 | 9/2011 | Hoasten | | |
| 2011/0233404 A1 * | 9/2011 | Sonstroem | | H01L 31/02164 250/332 |
| 2011/0299155 A1 * | 12/2011 | McCarthy | | G02B 5/26 359/359 |
| 2012/0212806 A1 * | 8/2012 | Shibata | | G02B 13/14 359/356 |
| 2012/0312976 A1 | 12/2012 | Boulanger et al. | | |
| 2013/0082183 A1 * | 4/2013 | Mudge | | G02B 3/10 250/349 |
| 2013/0306851 A1 * | 11/2013 | Le Noc | | G01J 5/20 250/252.1 |
| 2014/0002668 A1 | 1/2014 | Nguyen et al. | | |
| 2014/0043525 A1 * | 2/2014 | Azuma | | H04N 5/2257 348/357 |
| 2014/0198217 A1 | 7/2014 | Johnson et al. | | |
| 2015/0319378 A1 | 11/2015 | Hoelter et al. | | |
| 2016/0065848 A1 | 3/2016 | LeBeau et al. | | |

FOREIGN PATENT DOCUMENTS

| | | |
|---|---|---|
| EP | 1983485 | 10/2008 |
| EP | 2136554 | 12/2009 |
| JP | 2004004465 | 1/2004 |
| JP | 2004241491 | 8/2004 |
| JP | 2007267035 | 10/2007 |
| KR | 20050018370 | 2/2005 |
| KR | 20050023950 | 3/2005 |
| KR | 101006660 | 9/2005 |
| KR | 20060023957 | 3/2006 |
| KR | 100645746 | 5/2006 |
| WO | WO 00/23814 | 4/2000 |
| WO | WO 2004/027459 | 4/2004 |
| WO | WO 2005/015143 | 2/2005 |
| WO | WO 2012/015965 | 2/2012 |

* cited by examiner

INFRARED IMAGING SYSTEM SHUTTER ASSEMBLY WITH INTEGRATED THERMISTER

CROSS-REFERENCE TO RELATED APPLICATIONS

This application is a continuation of International Patent Application No. PCT/US2018/015590 filed Jan. 26, 2018 and entitled "INFRARED IMAGING SYSTEM SHUTTER ASSEMBLY WITH INTEGRATED THERMISTOR," which is incorporated herein by reference in its entirety.

International Patent Application No. PCT/US2018/015590 filed Jan. 26, 2018 claims priority to and the benefit of U.S. Provisional Patent Application No. 62/476,606 filed Mar. 24, 2017 and entitled "INFRARED IMAGING SYSTEM SHUTTER ASSEMBLY WITH REDUCED THERMAL EMISSION" which is hereby incorporated by reference in its entirety.

International Patent Application No. PCT/US2018/015590 filed Jan. 26, 2018 claims priority to and the benefit of U.S. Provisional Patent Application No. 62/451,631 filed Jan. 27, 2017 and entitled "INFRARED IMAGING SYSTEM SHUTTER ASSEMBLY WITH INTEGRATED THERMISTOR" which is hereby incorporated by reference in its entirety.

This application is a continuation-in-part of U.S. patent application Ser. No. 14/747,865 filed Jun. 23, 2015 and entitled "INFRARED IMAGING DEVICE HAVING A SHUTTER" which is hereby incorporated by reference in its entirety.

U.S. patent application Ser. No. 14/747,865 is a continuation of International Patent Application No. PCT/US2013/078551 filed Dec. 20, 2013 and entitled "INFRARED CAMERA SYSTEM HOUSING WITH METALIZED SURFACE," which claims the priority to and the benefit of U.S. Provisional Patent Application No. 61/747,789 filed Dec. 31, 2012 and entitled "INFRARED IMAGING DEVICE HAVING A SHUTTER" which is hereby incorporated by reference in its entirety.

International Patent Application No. PCT/US2013/078551 is a continuation-in-part of U.S. patent application Ser. No. 13/966,052 filed Aug. 13, 2013, now U.S. Pat. No. 9,473,681 issued Oct. 18, 2016 and entitled "INFRARED CAMERA SYSTEM HOUSING WITH METALIZED SURFACE" which is hereby incorporated by reference in its entirety.

U.S. patent application Ser. No. 14/747,865 is a continuation-in-part of U.S. patent application Ser. No. 13/966,052 filed Aug. 13, 2013, now U.S. Pat. No. 9,473,681 issued Oct. 18, 2016 and entitled "INFRARED CAMERA SYSTEM HOUSING WITH METALIZED SURFACE" which is hereby incorporated by reference in its entirety.

BACKGROUND

Technical Field

The present application generally relates to infrared imaging systems, and more particularly, to temperature detection, assembly, and shielding of infrared imaging devices.

Related Art

Some infrared imaging devices include shutters to perform calibration (e.g., flat-field correction (FFC)). In performing FFC, it is often desirable to accurately characterize the temperature of a shutter paddle for performing non-uniformity correction (NUC) and for accuracy. Some conventional techniques utilize a temperature sensor provided as part of an infrared sensor assembly in an effort to closely measure a temperature of the paddle. For example, the temperature sensor may be integrated into the circuitry of a focal plane array (FPA) in the infrared sensor assembly.

However, such integration adds complexity to the FPA design and related circuitry. Moreover, the temperature sensor may not be located closed enough to the shutter paddle and therefore lack accuracy. For example, the temperature sensor may inadvertently measure the temperature of the housing or other unintended elements. Consequently, additional processing and/or computations may need to be performed to compensate for these less accurate or unintended temperature measurements, thus adding to the overall cost and complexity of the infrared imaging device.

Infrared imaging devices, such as infrared cameras, are often subject to environmental conditions which may adversely affect their performance. For example, undesired radiation may reduce thermographic accuracy and may introduce low spatial frequency non-uniformities.

In particular, radiation received from outside a field of view (e.g., outside a target scene desired to be imaged) or non-uniform heating (e.g., by external sources or components of such devices) may significantly degrade the accuracy and uniformity of such devices. These effects can become especially significant for infrared imaging devices with shutters or other components positioned in close proximity to the infrared sensor assembly.

SUMMARY

A shutter assembly may be included as part of a modular infrared imaging device. The shutter assembly includes shutter a paddle that is used to selectively block a path of external infrared radiation of a scene from reaching infrared image sensors of the infrared imaging device. According to embodiments of the present disclosure, various techniques are provided to more accurately measure a temperature of the paddle so that this information can be used when performing, for example, calibration.

According to an embodiment, the shutter assembly may be electrically coupled to an infrared sensor assembly through mechanically engageable complementary electrical contacts to provide temperature information from the shutter assembly to the infrared sensor assembly.

According to an embodiment, a device may include a shutter assembly comprising: a paddle configured to move between an open position and a closed position, the paddle being configured to block external infrared radiation from reaching a focal plane array (FPA) in a closed position and pass the external infrared radiation to the FPA in an open position; and a thermistor embedded within the shutter assembly and configured to sense a temperature of the paddle when the paddle is in the open position.

According to an embodiment, a method may include: providing a paddle in a shutter assembly connected to an infrared sensor assembly, wherein the paddle is configured to move between a closed position blocking external infrared radiation from reaching a focal plane array (FPA) of the infrared sensor assembly, and an open position passing the external infrared radiation to the FPA; sensing a temperature of the paddle in the open position by a thermistor embedded within the shutter assembly; and determining the temperature of the paddle based on voltage values of the thermistor based on resistance values of the thermistor corresponding to the temperature sensed by the thermistor.

In additional embodiments, a shutter assembly may include a low emissive surface facing, or in proximity to, an array of infrared sensors. By positioning the low emissive surface near the array, out-of-field radiation (e.g., undesirable non-scene radiation) may be effectively blocked from the infrared sensors. As a result, image data captured by the infrared sensors may be primarily responsive to scene based infrared radiation, rather than undesired out-of-field radiation.

According to an embodiment, a system may include a plurality of infrared sensors implemented in a focal plane array (FPA) configured to capture thermal images in response to scene-based thermal radiation received over a first angle and out-of-field thermal radiation received over a second angle; a shutter assembly comprising an opening configured to pass the scene-based thermal radiation to the FPA, wherein the shutter assembly subtends over at least a portion of the second angle; and a surface disposed between the FPA and the shutter assembly configured to attenuate the out-of-field thermal radiation received by the FPA through the subtended portion of the second angle.

According to an embodiment, a method may include passing, through an opening in a shutter assembly, scene-based thermal radiation to a plurality of infrared sensors implemented in a focal plane array (FPA); attenuating, by a surface disposed between the FPA and the shutter assembly, out-of-field thermal radiation; capturing, by the FPA, thermal images in response to the scene-based thermal radiation received over a first angle and the attenuated out-of-field thermal radiation received over a second angle; wherein the shutter assembly subtends over at least a portion of the second angle; and wherein the surface attenuates the out-of-field thermal radiation received by the FPA through the subtended portion of the second angle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
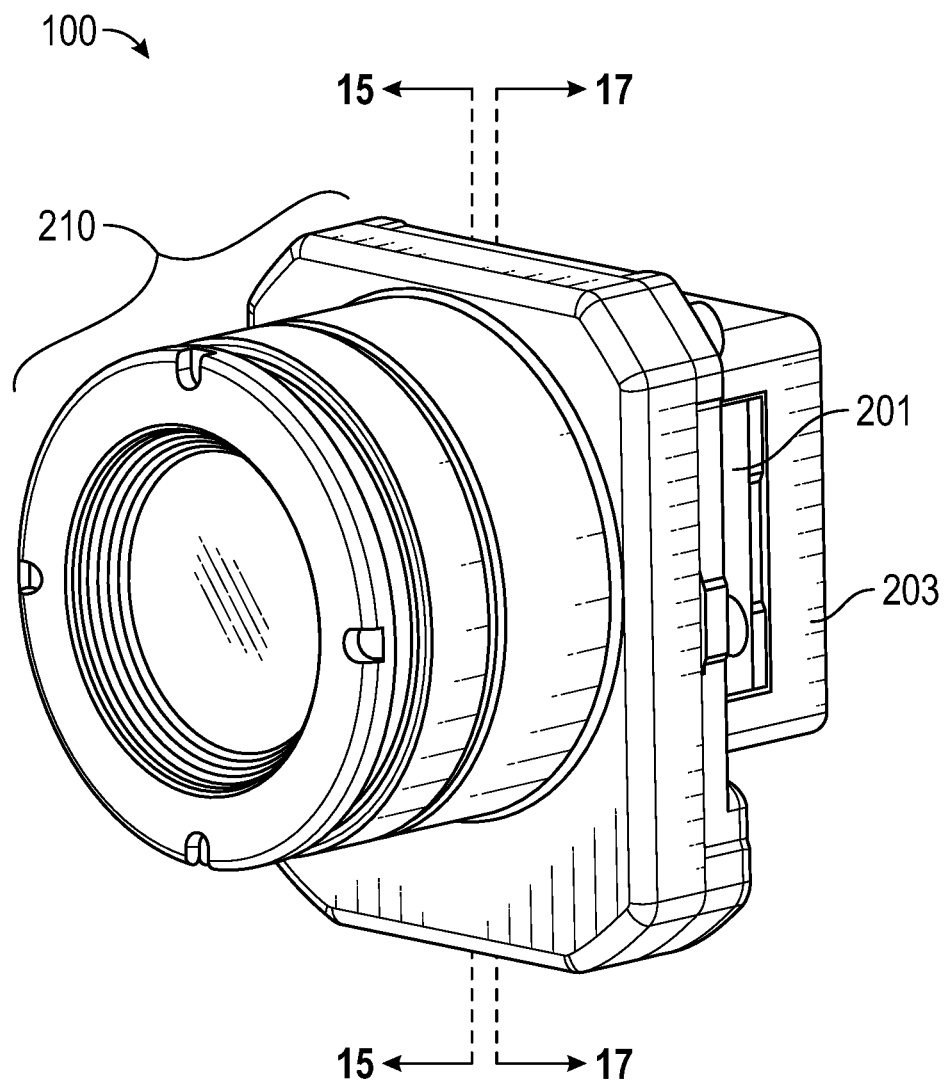
FIG. 1 is a perspective view of an infrared imaging device, according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various techniques are provided to perform a more accurate calibration of an infrared imaging device without adding to complexity and/or cost of the overall infrared imaging device. Specifically, a more accurate device and a method of measuring a shutter paddle temperature in a shutter assembly of a modular infrared imaging device is provided.

According to an embodiment of the present disclosure, a thermistor may be embedded within the shutter assembly and in close proximity to the paddle to more accurately measure a temperature of the paddle when the paddle is in the opened (e.g., stowed) position. Furthermore, when the infrared imaging device is assembled together (e.g., an infrared camera), the thermistor is electrically coupled to a controller or a processor in an adjacent infrared sensor assembly so that the temperature information of the paddle can be used to perform computations for the calibration process. Thus, a more accurate temperature of the paddle may be provided by embedding the thermistor within the shutter assembly and at or near the paddle in the open position. Moreover, the shutter assembly and the infrared sensor assembly may be electrically coupled via mechanically engageable complementary electrical contacts, thus substantially eliminating the need for cables and/or harnesses for electrical connections therebetween.

FIG. 1 illustrates a perspective view of an infrared imaging device 100 (e.g., an infrared camera), according to an embodiment of the present disclosure. The infrared imaging device 100 may be, for example, an infrared camera for capturing thermal images of a scene (e.g., an external scene).

Figure 2:
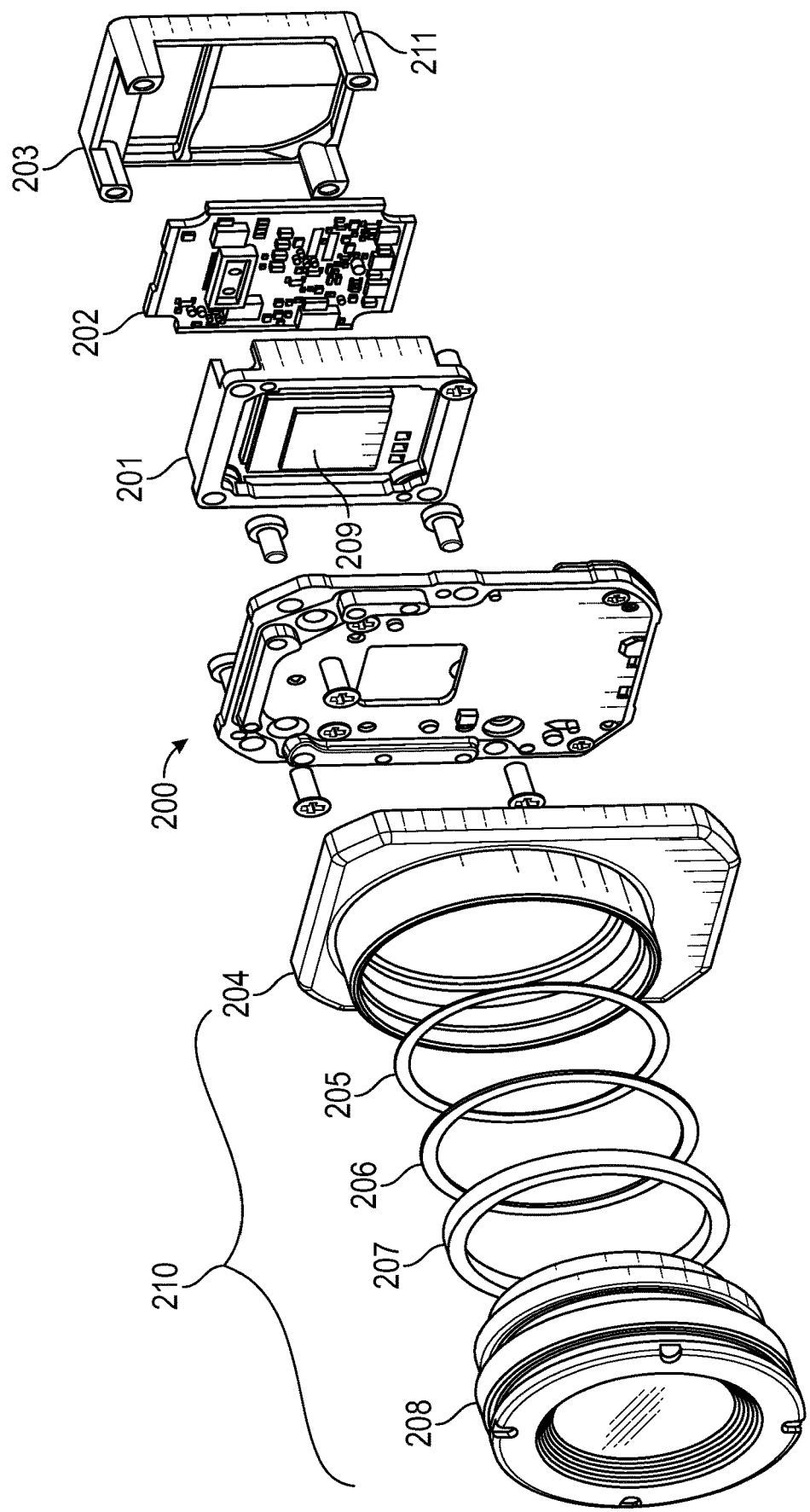
FIG. 2. is an exploded view of an infrared imaging device, according to an embodiment of the present disclosure.

FIG. 2 illustrates an exploded view of the infrared imaging device 100 illustrated in FIG. 1, according to an embodiment of the present disclosure. As illustrated, the infrared camera may be a modular device that is comprised of various modules or assemblies, such as, a lens assembly 210, a shutter assembly 200, an infrared sensor assembly 201, a circuit board 202, and a housing 203, coupled together. Thus, in some embodiments, each module or assembly may be manufactured separately and then assembled together to form a complete device, such as the infrared camera. Various screws, nuts, and/or clips may be used to assemble each of the assemblies or modules together. In some embodiments, the housing 203 may be configured to house the circuit board 202 and attach to the infrared sensor assembly 201 via housing legs 211. As such, the housing 203 covers and forms an encasement at one side of the infrared camera and the lens assembly 210 covers and forms an encasement at the other side of the infrared camera. In some embodiments, the housing 203 may be a metal housing (e.g., aluminum) and therefore may be used to dissipate heat away from the infrared imaging device 100. As provided throughout the present disclosure, an infrared camera is provided merely as one example of an infrared imaging device for ease of explanation of the various embodiments. However, it is not intended to be limiting. Instead, the infrared imaging device 100 may be other devices known to those skilled in the art that are designed to capture infrared images. As such, the terms "infrared imaging device" and "infrared camera" may be used interchangeably herein the present disclosure.

In some embodiments, the lens assembly 210 includes a lens barrel 208 and a lens barrel holder 204 (e.g., also referred to as a lens barrel flange). The lens barrel 208 includes various optical elements arranged to focus and pass radiation through the lens barrel 208 from a target scene (i.e., a scene external to the infrared camera) to infrared image sensors located inside of the infrared camera. The lens barrel 208 may be configured to screw-in or snap-in to the lens barrel holder 204. O-ring 205, washer 206, and wave spring 207 and may be arranged on or around the lens barrel 208 in various configurations to seal the lens barrel 208 on the lens barrel holder 204, for example, to prevent debris or moisture from entering the infrared camera.

Figure 3:
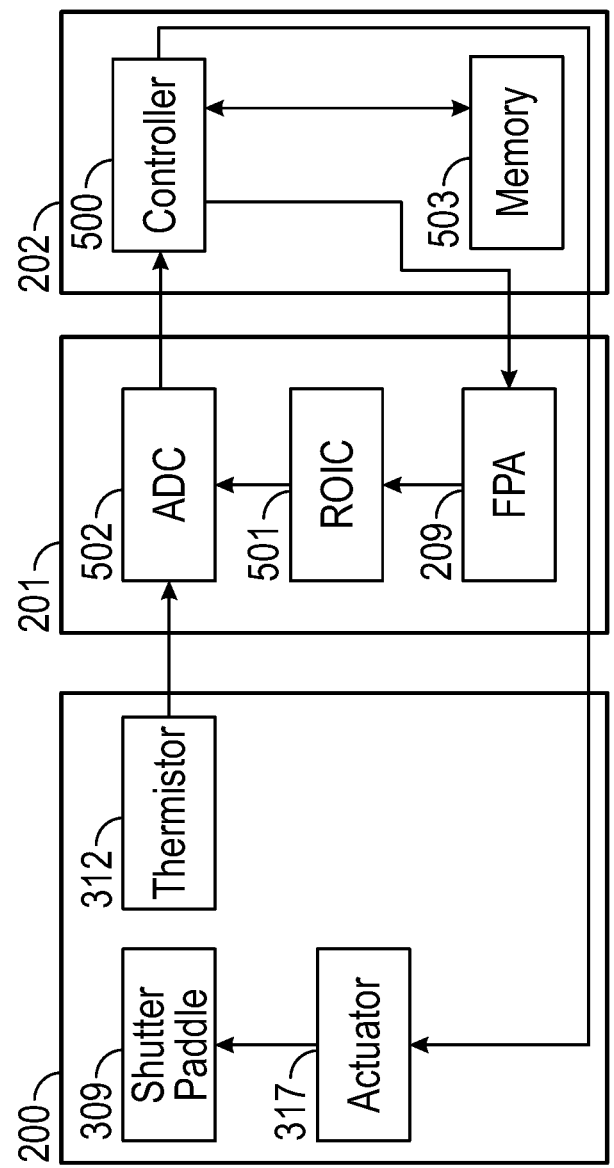
FIG. 3 is a block diagram of the shutter assembly, the infrared sensor assembly, and a circuit board assembly, according to an embodiment of the present disclosure.

FIG. 3 is a block diagram of the shutter assembly 200, the infrared sensor assembly 201, and the circuit board assembly 202, illustrating some of the elements included in each of these assemblies and the interconnections therebetween. In some embodiments, other elements and/or circuitry may be present. According to an embodiment of the present disclosure, the infrared sensor assembly 201 includes a plurality of infrared image sensors that may be arranged in an array or other manner. For example, in some embodiments, the infrared sensor assembly 201 may be implemented with an array of infrared sensors arranged in rows and columns to provide a focal plane array (FPA) 209. In some embodiments, the infrared sensor assembly 201 may be implemented as a wafer level package. In some embodiments, the infrared sensors of FPA 209 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In some embodiments, the infrared sensor assembly 201 may be provided in accordance with wafer level packaging techniques. In some embodiments, the FPA 209 may be implemented as microbolometers or other types of thermal imaging infrared sensors arranged in an array pattern to provide a plurality of pixels.

The FPA 209 may be controlled by a controller 500 at the circuit board assembly 202. For example, the controller 500 may be implemented as a processor configured to receive instructions from a memory 503, and execute the instructions. Based on the executed instructions, the controller 500 may provide a signal to the FPA 209 to capture thermal radiation from a target scene (e.g., an external scene) through the lens assembly 210, which may be used to generate a thermal image. When desired, the controller 500 may also provide a signal to the FPA 209 to stop capturing the thermal radiation, for example, when turning off the infrared camera.

The infrared sensor assembly 201 may also include various circuitry including, for example, a read out integrated circuit (ROIC) 501 and an analog-to-digital converter (ADC) 502. In some embodiments, the ROIC 501 may be configured to read or receive the captured thermal signals from the FPA 209 and provide the thermal signals to the ADC 502 where the thermal radiation signal is converted from analog signal to digital data stream. The converted digital data may be provided to the controller 500 at the infrared sensor assembly 201 for further processing. In some embodiments, the controller 500 may store the digital data in the memory 503 for later use. In other embodiments, the controller may further process the digital data to generate an image to display, for example, on a user display.

According to an embodiment of the present disclosure, the shutter assembly 200 is coupled to the infrared sensor assembly 201 to selectively block the thermal radiation from the external scene from reaching the FPA 209. In this regard, the shutter assembly 200 may include a shutter paddle 309 (or a shutter blade) that may be moved, rotated, or turned by an actuator 315 (e.g., a motor) to block the path of the thermal radiation to the FPA 209.

In some embodiments, the paddle 309 may act as a blackbody when blocking the thermal radiation path to facilitate reference temperature calibration of the FPA 209 (e.g., a non-uniformity correction (NUC) process or other calibration processes) as would be understood by one skilled in the art. For example, shutter assembly 200 may be utilized to perform a shutter-based flat field correction (FFC) process appropriately modified from shutter-based FFC techniques set forth in U.S. patent application Ser. No. 12/391,156 filed Feb. 23, 2009, which is incorporated herein by reference in its entirety.

In some embodiments, paddle 309 may be implemented as a reflective shutter to permit calibration of FPA 209 based on reflected thermal energy and known temperature in accordance with the disclosure provided by U.S. patent application Ser. No. 14/747,865 filed Jun. 23, 2015, which is hereby incorporated by reference in its entirety.

According to another embodiment of the present disclosure, the shutter assembly 200 includes a thermistor 312 embedded therein. The thermistor 312 may be adapted to obtain temperature information of the paddle 309 and provide it to the controller 500 via the ADC 502. Thus, the thermistor 312 and the ROIC 501 both provide analog inputs to the ADC 501 and a single digital data stream is efficiently provided to the controller 500 containing both temperature data from the thermistor 312 and pixel data from the FPA 209. Accordingly, the controller 500 may obtain an accurate temperature of the paddle 309 to use as a reference for performing thermal calibration of the FPA 209. The specific arrangement and implementation of the thermistor 312 within the shutter assembly 200 will be described later with reference to FIGS. 4-9.

As illustrated, the shutter assembly 200 and the circuit board assembly 202 are coupled with the infrared sensor assembly 201 through various electrical and mechanical connections. Although FIG. 3 illustrates just one ADC 502 with inputs from both the thermistor 312 and the ROIC 501, in some embodiments, more than one ADC may be implemented. For example, the thermistor 312 and the ROIC 501 may each have their own ADC. Yet in some embodiments, the ADC 501 may be built-in to the ROIC 501. Thus, the block diagram of FIG. 3 is intended to illustrate one example out of various possible arrangements and their interconnections.

Figure 4:
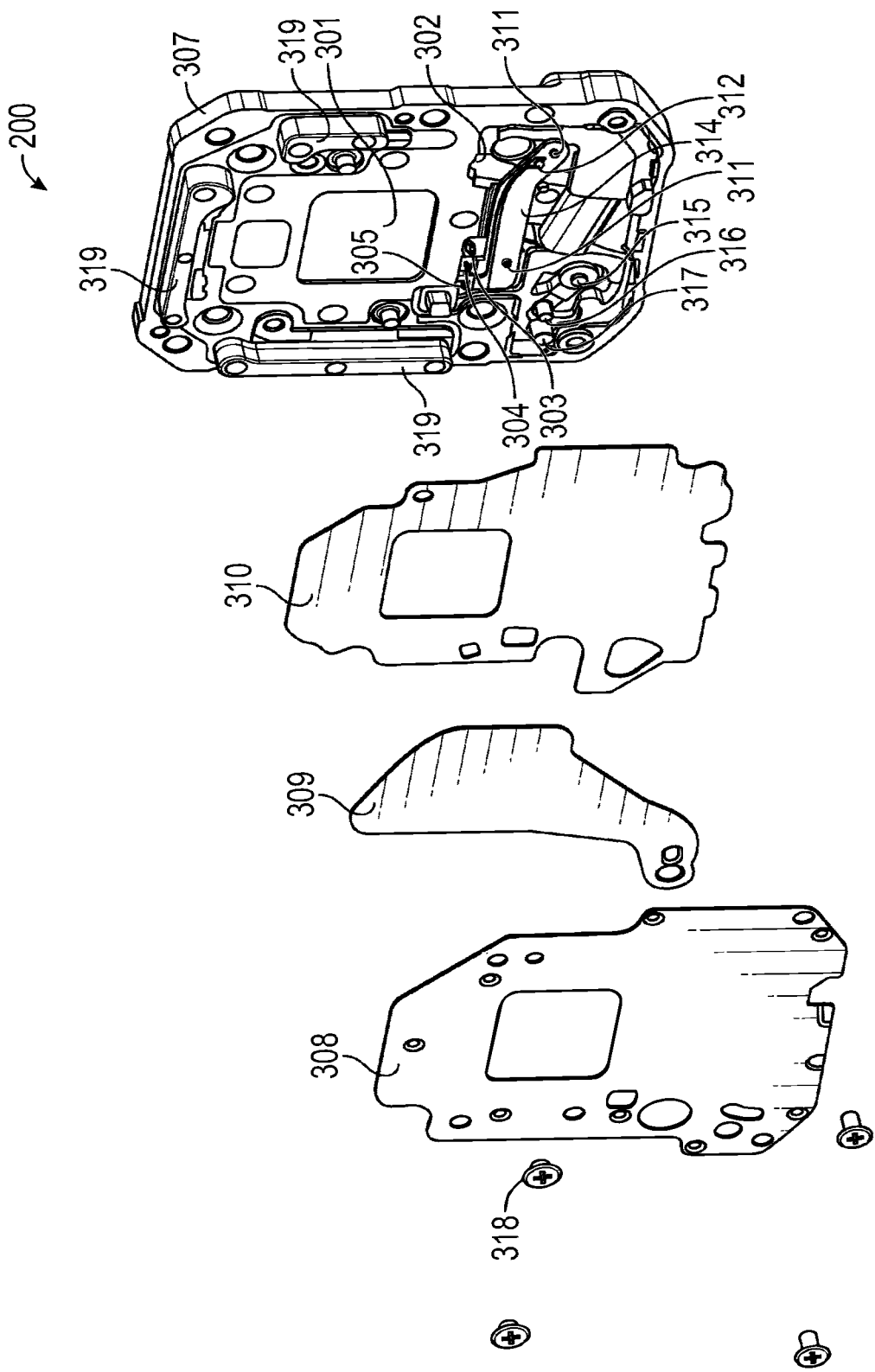
FIG. 4 is an exploded view of the shutter assembly, according to an embodiment of the present disclosure.

FIGS. 4-10 illustrate various views of the shutter assembly 200 from various angles. More particularly, FIG. 4 illustrates an exploded perspective view of the shutter assembly 200. The shutter assembly 200 may be made of a metallic material such as, for example, magnesium, and includes a shutter housing 307 configured to receive a shutter paddle 309 sandwiched between an inner plate 310 and an outer plate 308. When assembled together, screws 318 may be used to attach the inner plate 310 and the outer plate 308 to shutter housing 307. As such, when assembled, the paddle 309 is able to turn, rotate, or move between an open position and closed position (or stowed position) between the inner plate 310 and the outer plate 308 when the actuator 315 is actuated. In some embodiments, the shutter assembly 200 also includes protective structures 319 along the outer edges of the shutter assembly 200 as shown in FIG. 4. The protective structures 319 may serve to align the inner plate 310 and the outer plate 308 along the shutter assembly 200 and/or may also serve to align the lens assembly 210 when coupling the lens assembly 210 with the shutter assembly. In FIG. 4, the paddle 309 is shown in the closed position thereby blocking opening (e.g., aperture) 301, which is the thermal radiation path from the lens barrel 208 to the FPA 209. In some embodiments, the paddle 309 may be made of a metal such as aluminum or anodized aluminum. In other embodiments, the paddle 309 may be made of other materials or alloys that may be known to a person skilled in the art.

Figure 5:
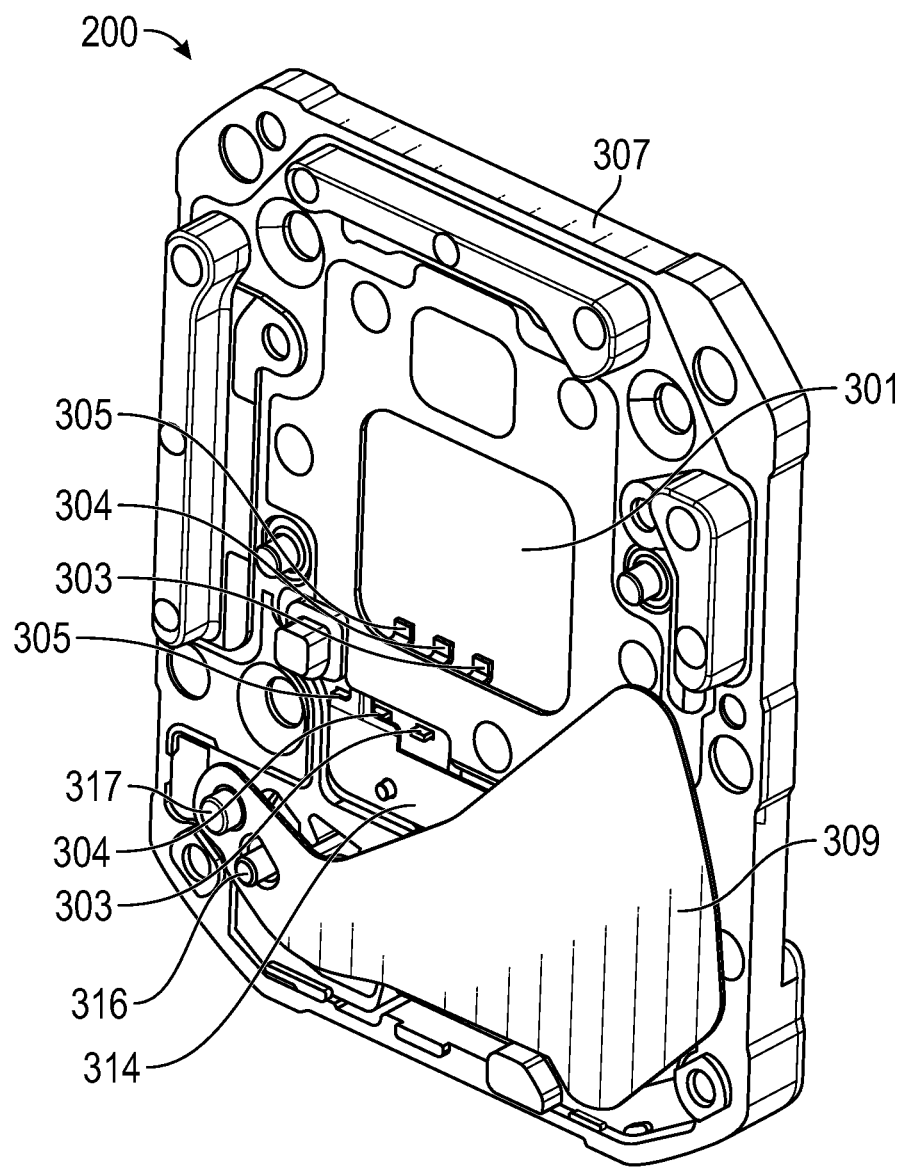
FIG. 5 is a perspective view of the shutter assembly, according to an embodiment of the present disclosure.

FIG. 5 illustrates a perspective view of the shutter assembly 200 including the paddle 309 but with the inner plate 310 and the outer plate 308 removed to illustrate the position of the paddle 309 relative to the remaining components of the shutter assembly 200.

As illustrated in the various views of the shutter assembly 200, the paddle 309 is connected to the shutter assembly 200 at a pivot point 317 such that the paddle 309 is able to rotate about the pivot point 317 as the rotation axis. The actuator 315 configured to rotate the paddle 309 is mounted inside a motor housing 306 (e.g., integrated with shutter housing 307 in the illustrated embodiment, or provided separately in other embodiments) of the shutter assembly 200 and in some embodiments, the actuator 315 may be implemented using a magnetic rotor, electric motor, or other similar electromechanical actuator adapted to produce motion and/or force in response to receiving an electric current and/or voltage.

When power is applied to the actuator 315, the actuator 315 causes drive pin 316 to move, which in turn, causes the paddle 309 to move (e.g., rotate from an open position to the closed position). When power is removed from the actuator 315, the actuator 315 causes the drive pin 316 to move again, which in turn, causes the paddle 309 to rotate back to the open position. Thus, according to an embodiment of the present disclosure, the paddle 309 rotates to the closed position when power is applied the actuator 315 and the paddle is moved to or stays in the open position when power is removed or not applied to the actuator 315. The paddle 309 illustrated in FIG. 4 is shown in the open position because the paddle is stowed away from the opening 301 (i.e., not blocking the opening 301) of the shutter assembly 200.

In some embodiments, power for the actuator 315 is provided through mechanically engageable electrical contacts 302, 303. The mechanically engageable electrical contacts 302, 303 may be implemented to engage with mechanically engageable electrical contacts 402, 403 provided on an adjacent assembly, such as the infrared sensor assembly 201. In some embodiments, the mechanically engageable electrical contacts 302, 303 may be mechanically engageable spring contacts or compression contacts and the mechanically engageable electrical contacts 402, 403 may be conductive pads that are complementary to the spring contacts. The spring contacts may be implemented such that when the shutter assembly 200 is coupled with the infrared sensor assembly 201, the electrical contacts 302, 303 (e.g., spring contacts) are compressed against the complementary electrical contacts 402, 403 (e.g., conductive pads) and the compression by the spring contacts maintain the electrical engagement. In some embodiments, the electrical contacts 402, 403 may instead be spring or compression contacts and the electrical contacts 302, 303 may be complementary conductive pads.

Figure 6A:
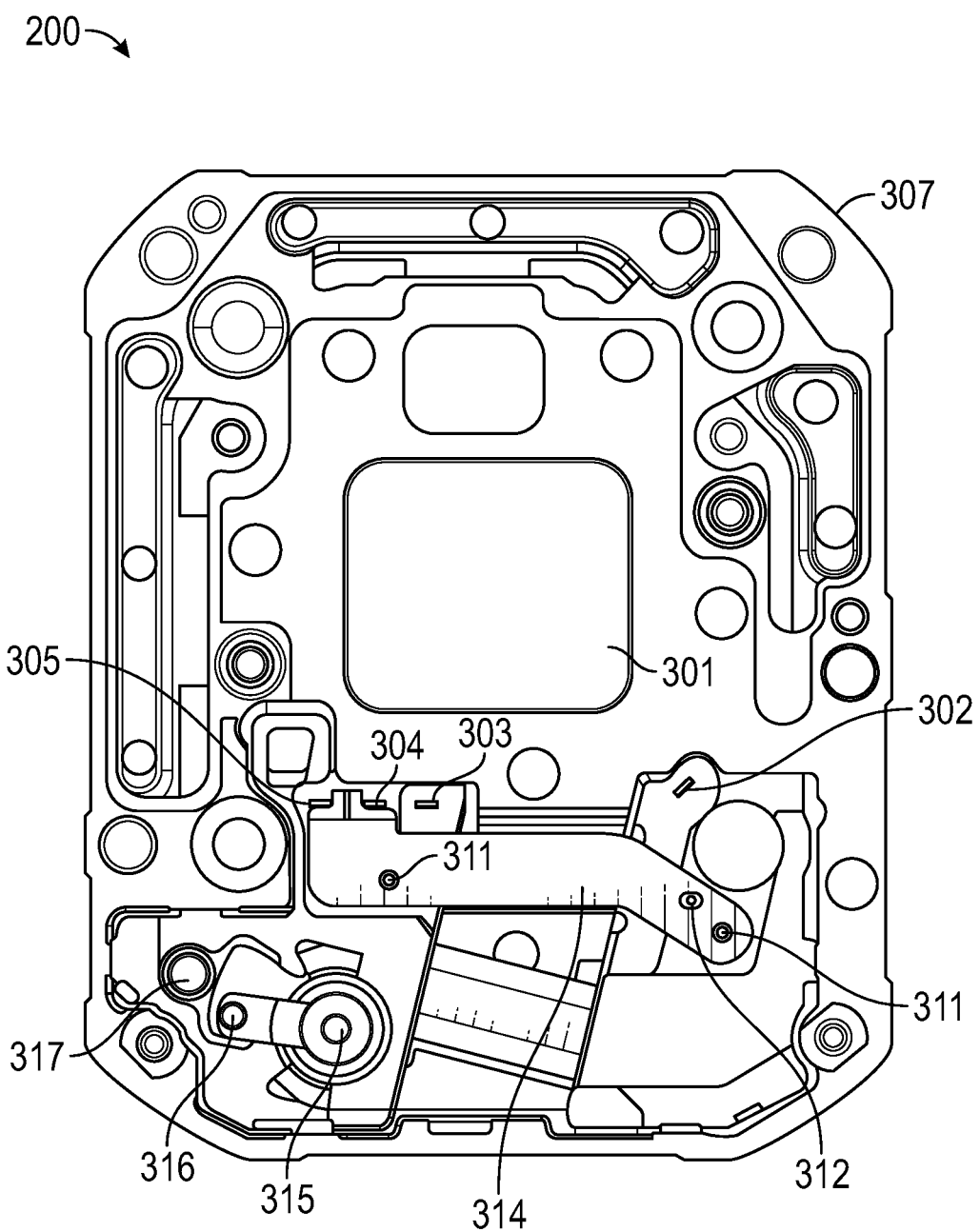
FIGS. 6A and 6B are a front view and a perspective view of the shutter assembly, respectively, according to an embodiment of the present disclosure.
Figure 6B:
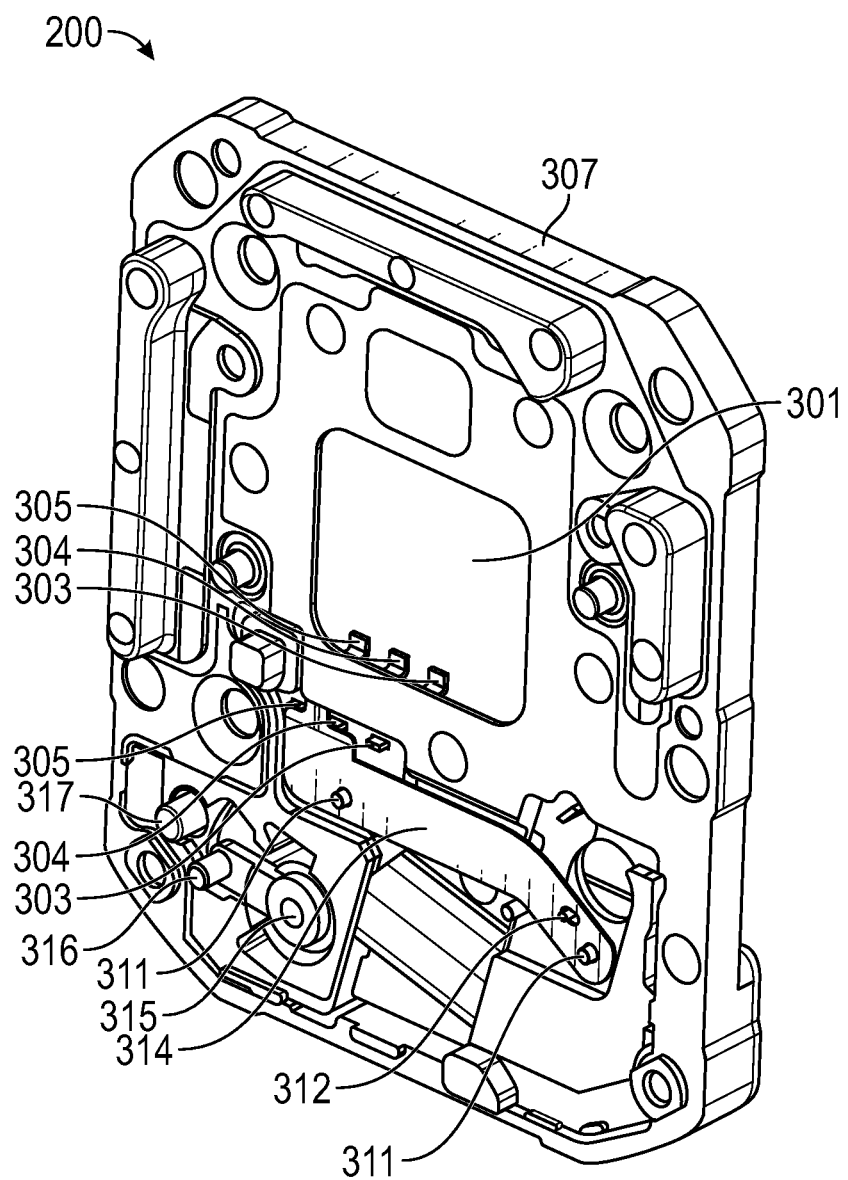
Figure 7A:
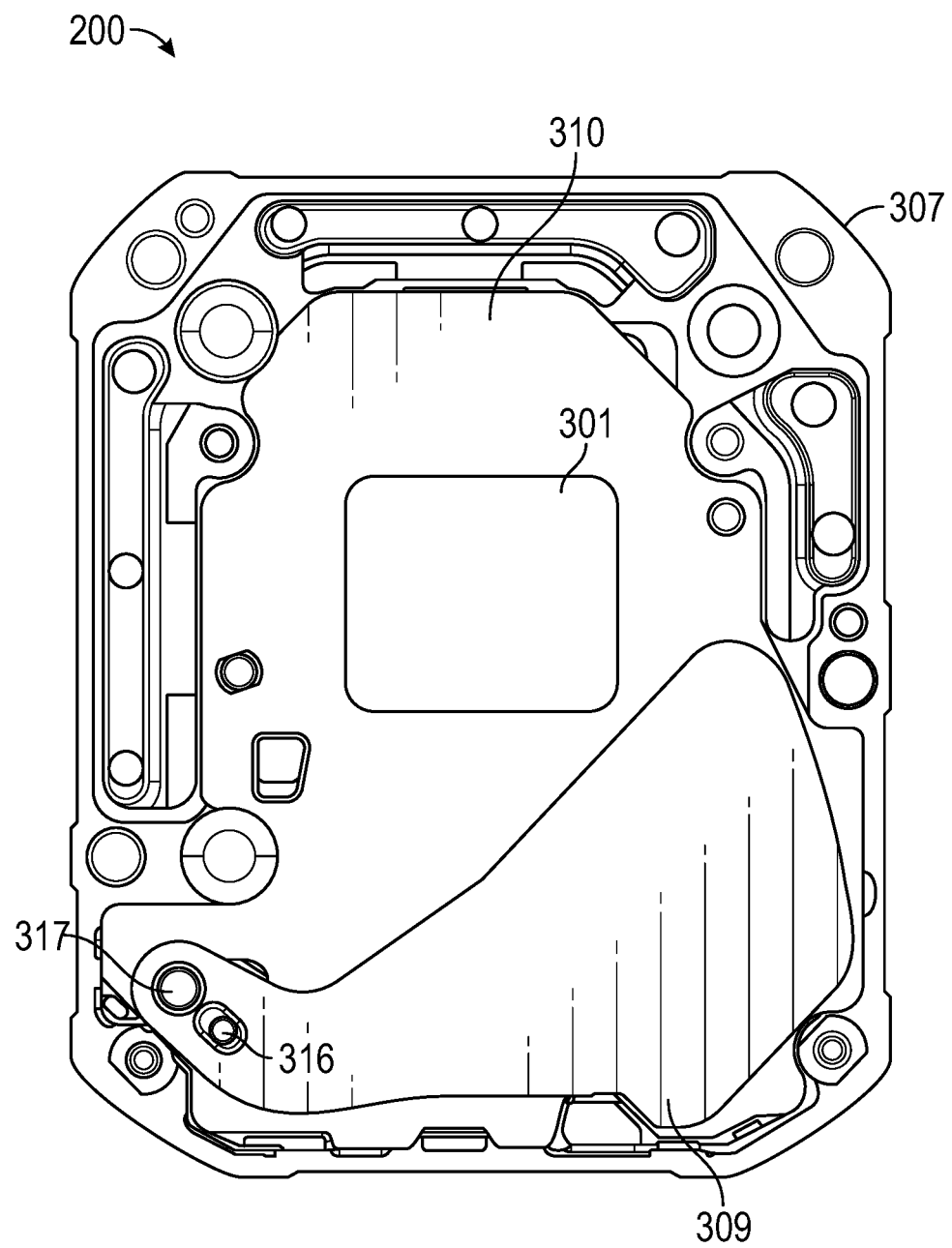
FIGS. 7A and 7B are a front view and a perspective view of the shutter assembly, respectively, according to an embodiment of the present disclosure.
Figure 7B:
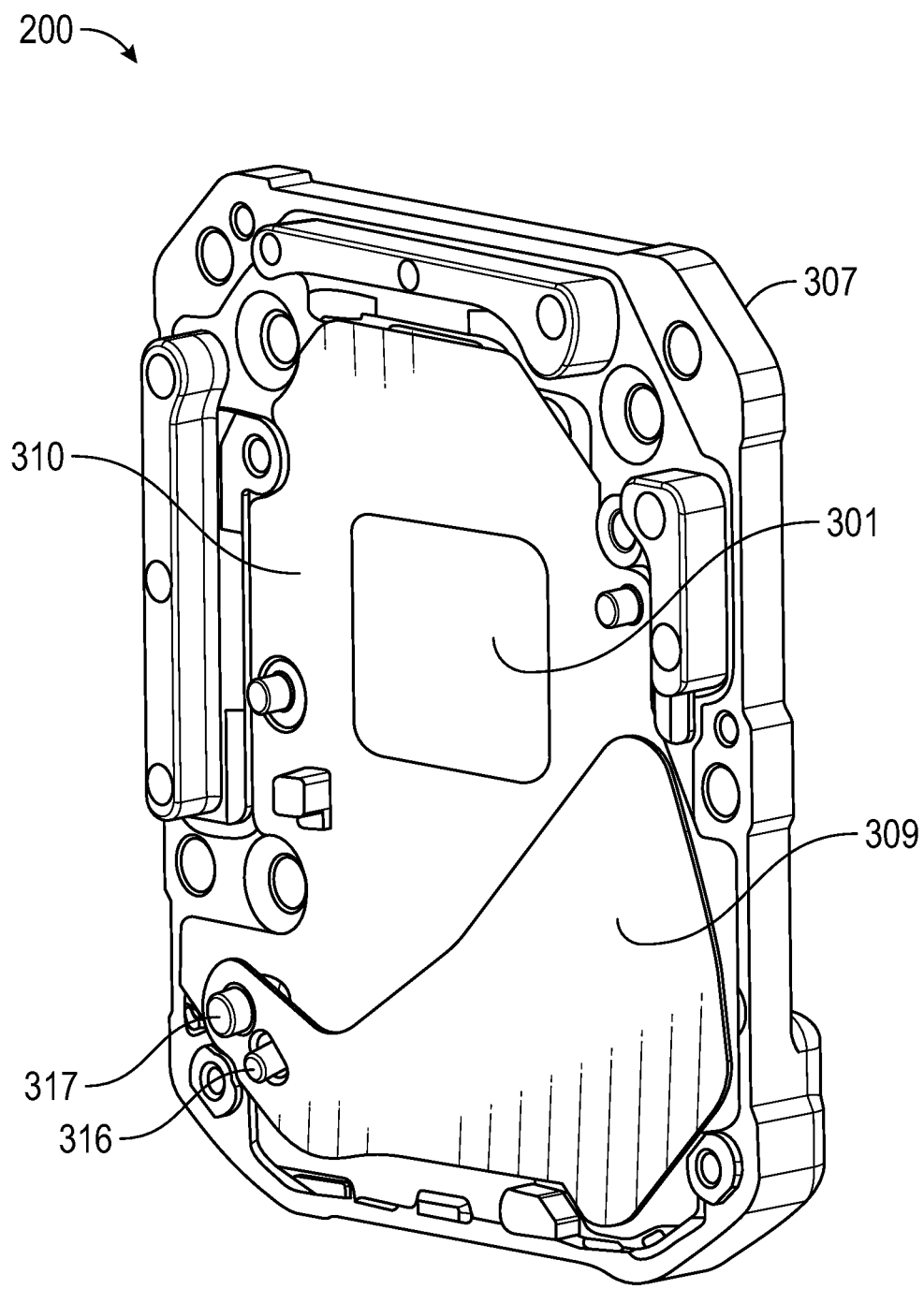

FIGS. 6A and 6B illustrate a front view and a perspective view, respectively, of the shutter assembly 200 with the paddle 309, the inner plate 310, and the outer plate 308 removed. FIGS. 7A and 7B illustrate a front view and a perspective view, respectively, of the shutter assembly 200 including the inner plate 310 and the paddle 309, but with the outer plate 308 removed. According to an embodiment of the present disclosure, the shutter assembly 200 includes a thermistor 312 for measuring a temperature of the paddle 309. The thermistor 312 may be embedded, for example, in a flexible-rigid cable 314 that is mounted to the shutter assembly 200 with mounting pins 311 and positioned such that the thermistor 312 is adjacent the paddle 309 when it is in the open position. In this manner, when the paddle 309 is in the open position, the thermistor 312 can detect the temperature of the paddle 309, for example, through conduction, convection, and/or radiation, and the temperature of the thermistor 312 changes to substantially the same temperature as the paddle 309, which in turn changes the resistance of the thermistor 312 based on the temperature of the thermistor 312. Thus, when a voltage is applied through the thermistor 312, for example, through other circuitry on the infrared sensor assembly 201, the resistance value of the thermistor 312 may be determined based on the voltage value, which in turn may be used to compute the temperature of the thermistor 312. In some embodiments, the voltage may be applied in series across the thermistor 312 (having a variable resistance) and a fixed resistor. In such case, the temperature of the thermistor 312 may still be computed by accounting for the resistance value of the fixed resistor and the variable resistance by the thermistor 312.

In some embodiments, the inner plate 310 may be mounted between the paddle 309 and the thermistor 312. As shown in FIGS. 7A-7B, the shutter assembly 200 includes various components such as the actuator 315, the actuator drive pin 316, the mounting pins 311, and/or the thermistor 312, as already described above. Thus, the inner plate 310 may serve to cover these components to protect them from the paddle 309 as it moves between the opened and closed positions so that the components do not interfere with the movement of the paddle 309 (e.g., such that the paddle 309 does not catch on one or more of the components). The paddle 309 is mounted such that an entire surface area of one side of the paddle 309 is in contact with and abutting the inner plate 310 so that the temperature of the paddle 309 is conductively transferred to the inner plate 310. The inner plate 310 is directly adjacent the thermistor 312 (e.g., touch or almost touching the thermistor 312) so that as the temperature of the paddle 309 changes, the temperature of the inner plate 310 change. In turn, the temperature of the thermistor 312 is changed correspondingly with the temperature of the inner plate 310. Consequently, as the temperature of the thermistor 312 changes, the resistance of the thermistor 312 changes.

In some embodiments, the inner plate 310 may be implemented as a substantially flat sheet of material such as, for example, a metallic material or other material having a high thermal conductivity. For example, the thermal conductivity of the inner plate 310 is high enough such that heat from the paddle 309 transfers to the inner plate 310 to maintain a temperature of the inner plate 310 at the same temperature as the paddle 309.

Figure 8:
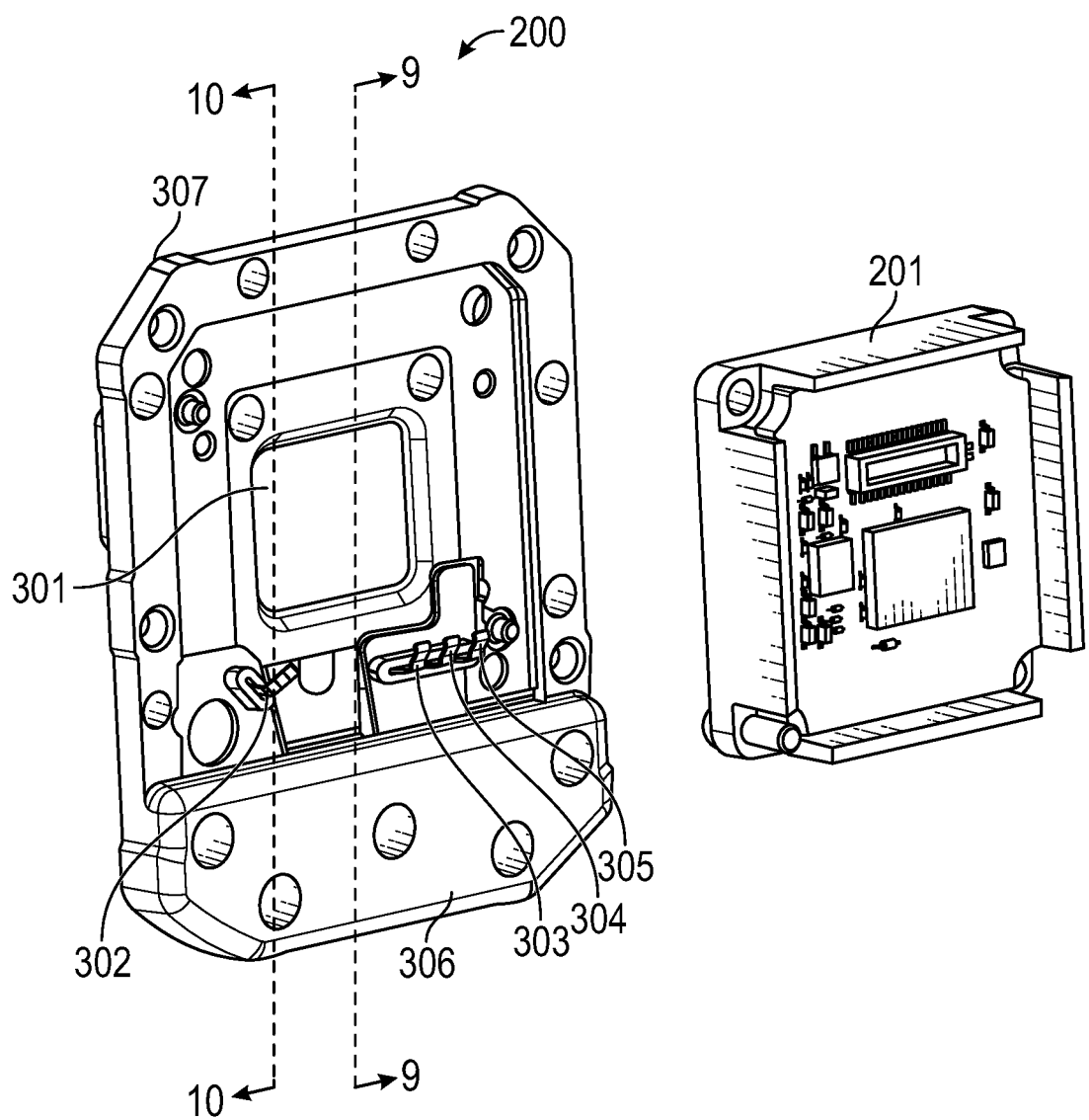
FIG. 8 is a perspective view of a shutter assembly and an infrared sensor assembly, according to an embodiment of the present disclosure.

FIG. 8 illustrates a perspective view of the back of the shutter assembly 200 and the infrared sensor assembly 201 (i.e., from the side in which the housing 203 attaches). According to an embodiment of the present disclosure, the thermistor 312 is electrically coupled to electrical contacts 304, 305 at the back side of the shutter assembly 200 as shown in FIG. 8. The thermistor 312 may be coupled to the mechanically engageable electrical contacts 304, 305 through conductive paths provided in the flex-rigid cable 314. By way of example and not of limitation, the flex-rigid cable 314 may be implemented as a ribbon cable that is substantially flat and wide, or it may be implemented as other types of conductive material with an insulated sheath, cover, or coating. Furthermore, while an flat and wide conductive material is provided in the present disclosure, the electrical coupling between the thermistor 312 and the mechanically engageable electrical contacts 304, 305 may instead be implemented using, for example, wiring or electrical traces on a substrate.

Figure 9:
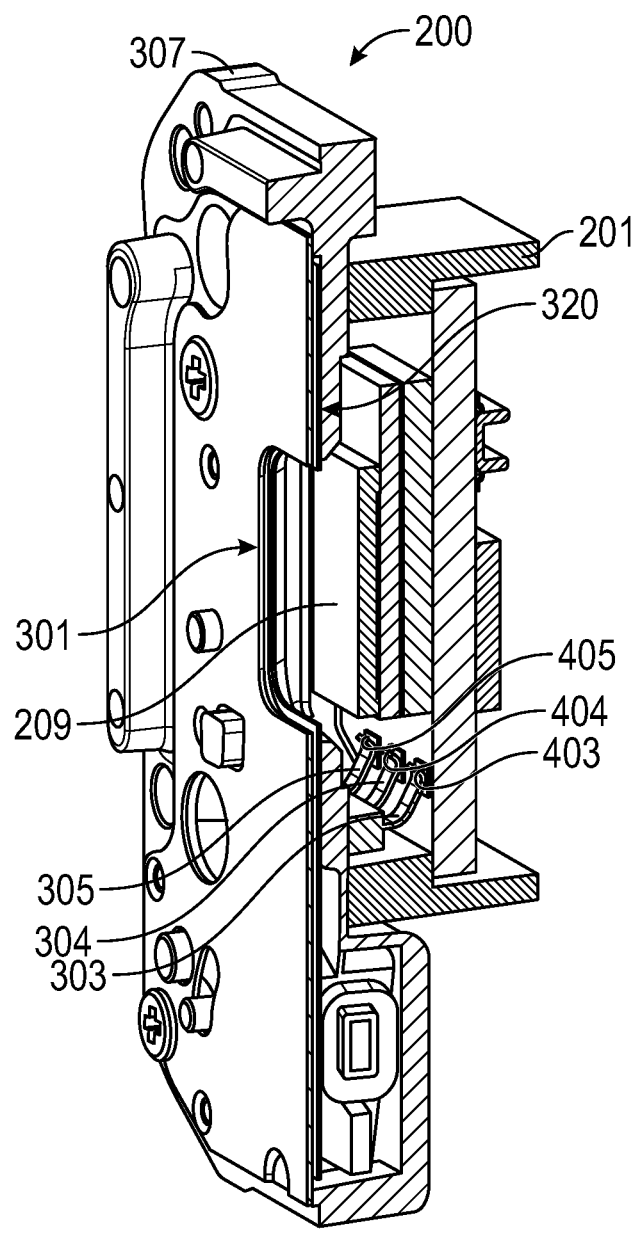
FIG. 9 is a perspective cross-sectional view along the lines 9-9 of FIG. 8, according to an embodiment of the present disclosure.
Figure 10:
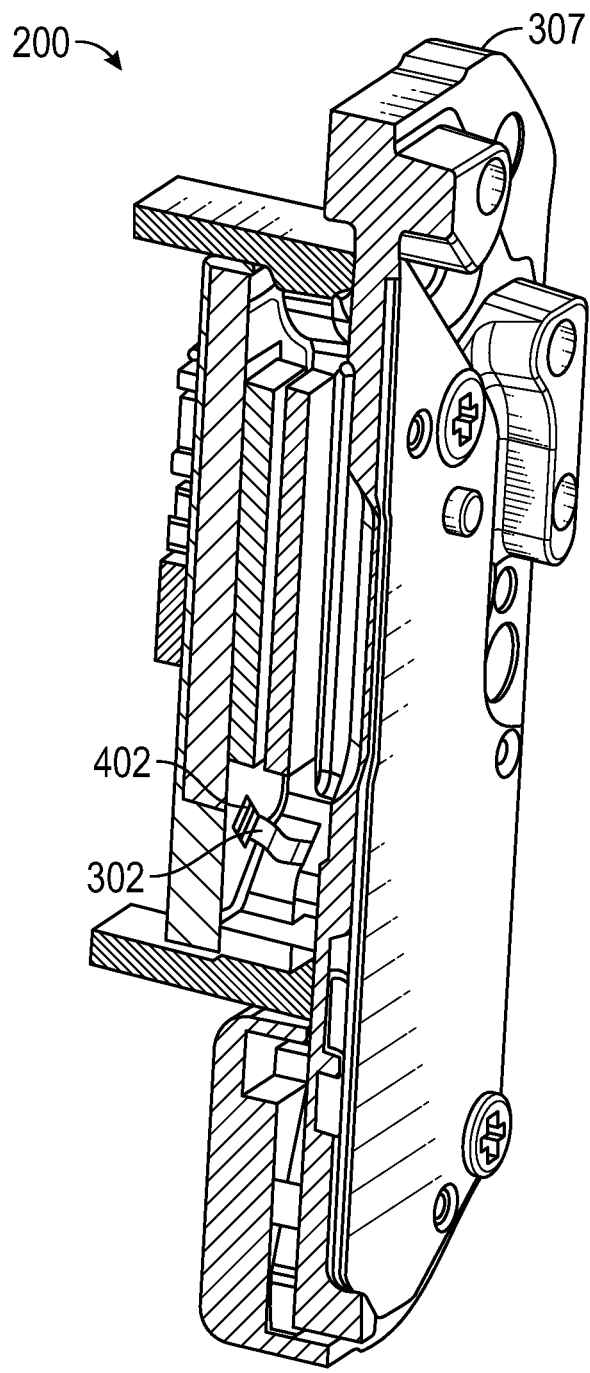
FIG. 10 is a perspective cross-sectional view along the lines 10-10 of FIG. 8, according to an embodiment of the present disclosure.

FIGS. 9-10 illustrate cross-sectional views of the shutter assembly 200 coupled to the infrared sensor assembly 201. More particularly, FIG. 9 illustrates a cross-sectional view along the lines 9-9 of FIG. 8 and FIG. 10 illustrates a cross-sectional view along the lines 10-10 of FIG. 8. In some embodiments, as illustrated in FIGS. 9 and 10, the mechanically engageable electrical contacts 304, 305 may be implemented to engage with corresponding complementary mechanically engageable electrical contacts 404, 405 provided on the infrared sensor assembly 201. In some embodiments, the mechanically engageable electrical contacts 304, 305 may be spring or compression contacts and the mechanically engageable electrical contacts 404, 405 may be conductive pads that are complementary to the mechanically engageable electrical contacts 304, 305. The spring contacts (e.g., mechanically engageable electrical contacts 304, 305) may be implemented such that when they are engaged with the corresponding conductive pads (e.g., mechanically engageable electrical contacts 404, 405), the mechanically engageable electrical contacts 304, 305 are compressed against the mechanically engageable electrical contacts 404, 405 and the compression maintains the electrical engagement.

Similarly to the mechanically engageable electrical contacts 304, 305 and mechanically engageable electrical contacts 404, 405 for the thermistor 312, the mechanically engageable electrical contacts 302, 303 and mechanically engageable electrical contacts 402, 403 for the actuator 315 are also shown in FIGS. 9 and 10. In some embodiments, the spring contacts may be a bent conductive metal that is further bent when compressed. In other embodiments, the spring contacts maybe implemented using a spring coil. Accordingly, the thermistor 312 and the actuator 315 of the shutter assembly 200 are electrically coupled with the infrared sensor assembly 201 when the shutter assembly 200 and the infrared sensor assembly 201 are assembled together, for example, using screws, nuts, and/or clips. Separate harness or cables are not necessary to electrically power the actuator 315 or to measure the voltage values and/or resistance values of the thermistor 312 because the mechanically engageable electrical contacts 302-305 and the complementary mechanically engageable electrical contacts 402-405 provide a cableless electrically conductive path between the shutter assembly 200 and the infrared sensor assembly 201.

Figure 11:
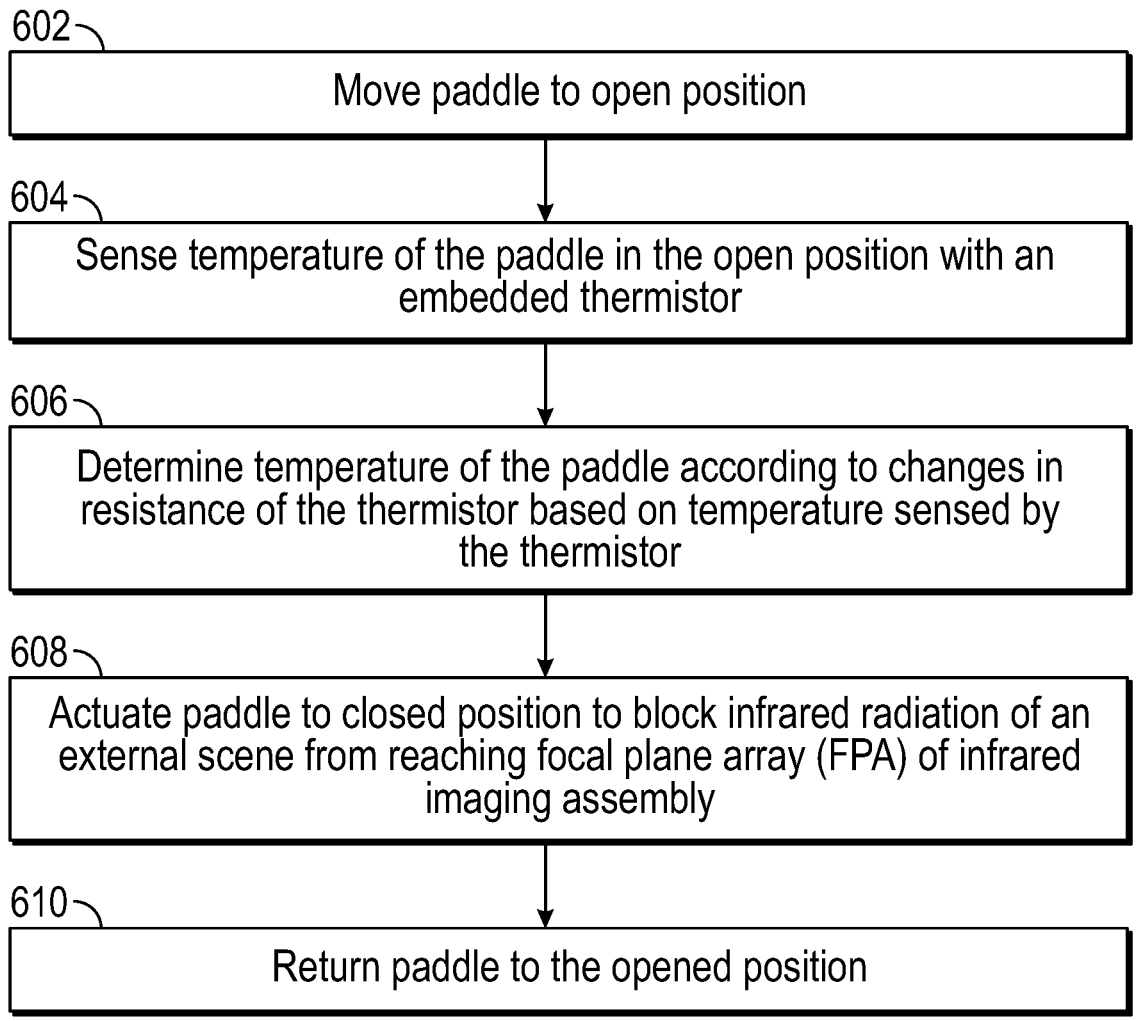
FIG. 11 is a flow chart of a process of operating the shutter assembly, according to an embodiment of the present disclosure.

FIG. 11 is a flowchart of a process of operating the shutter assembly 200 by the infrared camera 100 according to an embodiment of the present disclosure. For example, the shutter operation may be performed as part of various NUC and/or radiometric calibration process when operating the infrared camera as would be understood by one skilled in the art.

At block 602, paddle 309 is at the initial open position (e.g., stowed position), or if it is in any other position (e.g., closed position) the paddle 309 is moved to the open position.

At block 604, a temperature of the paddle 309 in the open position is conductively and/or convectively sensed by the thermistor 312 embedded within the shutter assembly 200 (e.g., embedded in the flex-rigid cable 314).

At block 606, the resistance of the thermistor 312 changes based on the temperature of the paddle 309, and the resistance of the thermistor 312 may be measured (by measuring the voltage) to determine the temperature of the paddle 309.

At block 608, controller 500 may trigger a voltage to be provided to the shutter assembly 200 to cause the actuator 315 move the paddle 309 to the closed position to block infrared radiation of the external scene from reaching the FPA 209 of the infrared imaging assembly 201. Because the temperature of the paddle 309 has already been determined, the FPA 209 can capture infrared radiation information of the paddle 309 and this information can be processed by the controller 500 via the ADC 502 for radiometric calibration processes, NUC processes, and/or other calibration processes.

At block 610, the paddle 309 is returned to the open position, for example, by removing the current or voltage that was applied to the actuator 315.

In some embodiments, the paddle 309 is moved from the open position to the closed position and back to the open position in less than approximately 30 milliseconds. In other embodiments, the paddle 309 is moved from the open position to the closed position and back to the open position in less than approximately 10 milliseconds. Accordingly, the paddle 309 generally remains in the open position majority of the time during operations of the infrared imaging device 100. In some embodiments the paddle 309 stays in the open position when the actuator 315 is de-energized, e.g., when the infrared camera is turned off or when the shutter assembly 200 is not assembled together with the infrared sensor assembly 201.

In some embodiments, the actuator 315 may utilize a voltage of approximately 2.0 volts or less, and exhibit drive power consumption of approximately 400 milliwatts or less. In some embodiments, such drive voltage may be approximately 1.8 volts.

Figure 12:
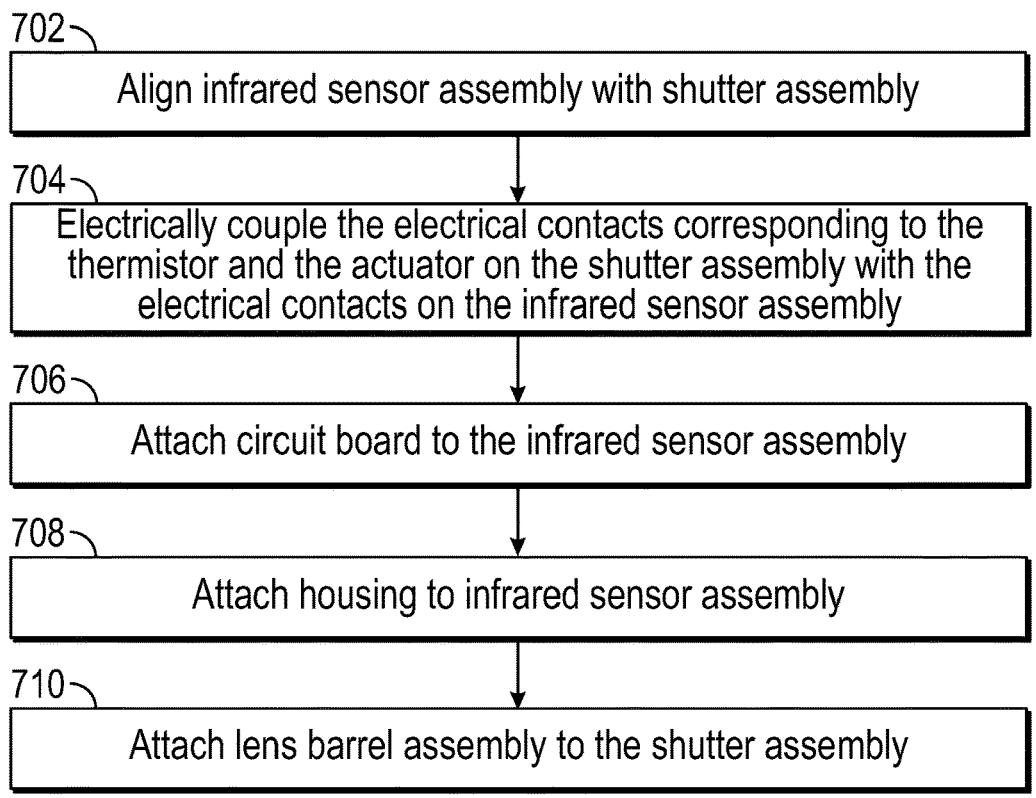
FIG. 12 is a flow chart of a process of assembling the infrared imaging device, according to an embodiment of the present disclosure.

FIG. 12 is a flowchart of a process of assembling the infrared camera 100 according to an embodiment of the present disclosure. As described above, the infrared camera 100 according to various embodiments is a modular camera where each module or assembly may be manufactured separately and assembled together. In some embodiments, the modules may be assembled by a manufacturer in a factory setting.

At block 702, the infrared sensor assembly 201 is aligned with the shutter assembly 200. By aligning the infrared sensor assembly 201 with the shutter assembly 200, the mechanically engageable electrical contacts 302-305 (e.g., spring contacts) of the shutter assembly 200 are also aligned with their corresponding complementary mechanically engageable electrical contacts 402-405 (e.g., the conductive pads) of the infrared sensor assembly 201. At block 704, the infrared sensor assembly 201 is coupled together with the shutter assembly 200. In doing so, the mechanically engageable electrical contacts 302-305 are compressed against the complementary mechanically engageable electrical contacts 402-405 to form an electric connection. In some embodiments, the infrared sensor assembly 201 may be coupled with the shutter assembly 200 using screws 318 (e.g., male screws and female screws). In other embodiments, clips (e.g., snap-on clips) or other suitable hardware may be utilized to couple the assemblies together.

At block 706, the circuit board 202 is coupled with the infrared sensor assembly 201. In some embodiments, some circuitry on the circuit board 202 may be configured to be coupled with corresponding circuitry on the infrared sensory assembly 201. For example, the circuit board 202 may include an integrated circuit (IC) chip and the infrared sensor assembly 201 may include a corresponding socket for the IC chip. Accordingly, such electrical coupling is made and in some embodiments, the circuit board 202 may be coupled with the infrared sensor assembly 201 using screws and/or clips. In other embodiments, the circuit board 202 may simply abut against the infrared sensor assembly 201, and at block 708, the housing 203 may be attached to the infrared sensor assembly 201 to hold the circuit board 202 in place. In some embodiments, the housing 203 may also utilize screws and/or clips to attach to the infrared sensor assembly 201, as illustrated in FIG. 2.

At block 710, the lens assembly 210 is attached to the shutter assembly 200 using for example, screws, clips, or other suitable means to attach to the shutter assembly 200.

In view of the above disclosure, a modular infrared imaging device is described having at least a separate shutter assembly and a separate infrared sensor assembly. In various embodiments, a thermistor is embedded within the shutter assembly and is disposed close to the shutter paddle so that an accurate temperature of the paddle may be obtained. That is, the thermistor is located as close as possible to the paddle, contrarily to other conventional techniques that integrate temperature sensors with, for example, the FPA located farther away from the paddle. Furthermore, this temperature is provided to a controller located at an adjacent module, such as the infrared sensor assembly or other circuit boards where the temperature information is used to carry out radiometric calibrations, NUC processes, and/or other calibration processes. It will be appreciated that the temperature information is electrically provided from the shutter assembly to the infrared sensor assembly through a pair of complementary mechanically engageable electrical contacts that are configured to be engaged merely by coupling the shutter assembly and the infrared sensor assembly together and without the use of additional cabling or harnesses. It is also conceivable that various assemblies of the modular infrared imaging device are interchangeable with other assemblies or other devices. For example, an infrared imaging device may be designed to operate with or without a shutter assembly, and therefore, the shutter assembly may be removed or installed, as desired, by a user without having to worry about electrically connecting cables between the assemblies.

As shown in FIGS. 1 and 2, shutter assembly 200 may be positioned between infrared sensor assembly 201 and lens assembly 210. This arrangement provides significant flexibility in the implementation of infrared imaging device 100. For example, because shutter assembly 200 is behind lens assembly 210, a variety of different optical elements or other components may be used. In this regard, various lens barrels 208 may be selectively attached to lens barrel holder 204 (e.g., in a modular fashion) to permit user-selected optical elements 212 (shown in FIG. 15) to be used with infrared imaging device 100 to accommodate a variety of different focal lengths for use in different environmental and operating conditions. Moreover, this can be done without requiring disassembly or removal of shutter assembly 201 from infrared imaging device 100.

To minimize the size of shutter assembly 200 and to permit it to be used with a variety of lens configurations, shutter assembly 200 may be positioned in close proximity to (e.g., adjacent to) infrared sensor assembly 201. For example, as shown in FIG. 9, FPA 209 of infrared sensor assembly 201 may be positioned in close proximity to shutter assembly 200.

However, if shutter assembly 200 is not in thermal equilibrium with FPA 209, such a physical arrangement of shutter assembly 200 and FPA 209 can permit unintended out-of-field radiation (e.g., undesirable non-scene radiation) to be passed from shutter assembly 200 to FPA 209. In this regard, when shutter assembly 200 is near to FPA 209, shutter assembly 200 will subtend large solid angles above and within the field of view of FPA 209. If uncorrected, shutter assembly 200 may be a dominant source of out-of field radiation. This can result in significant non-uniformities in the images captured by FPA 209, particularly under dynamic thermal conditions (e.g., in the presence of changing environmental temperatures). For example, individual pixel values of the captured images may include contributions from the out-of-field radiation which appear as noise or unintended offsets in the pixel values, thus degrading the captured images.

To overcome these problems, one or more surfaces 320 of shutter assembly 200 facing FPA 209 may be implemented as low emissive surfaces (e.g., reflective metal surfaces such as aluminum, stainless steel, gold, and/or other materials having very little or no emissivity) to significantly reduce the undesirable out-of-field radiation received by FPA 209. For example, in some embodiments, surfaces 320 may be implemented with material having relatively high thermal conductivity, relatively low emissivity (e.g., emissivity in a range of approximately 0.02 to approximately 0.11 in some embodiments), and having a tendency to maintain these properties despite exposure to a variety of environmental conditions over several years.

Figure 13:
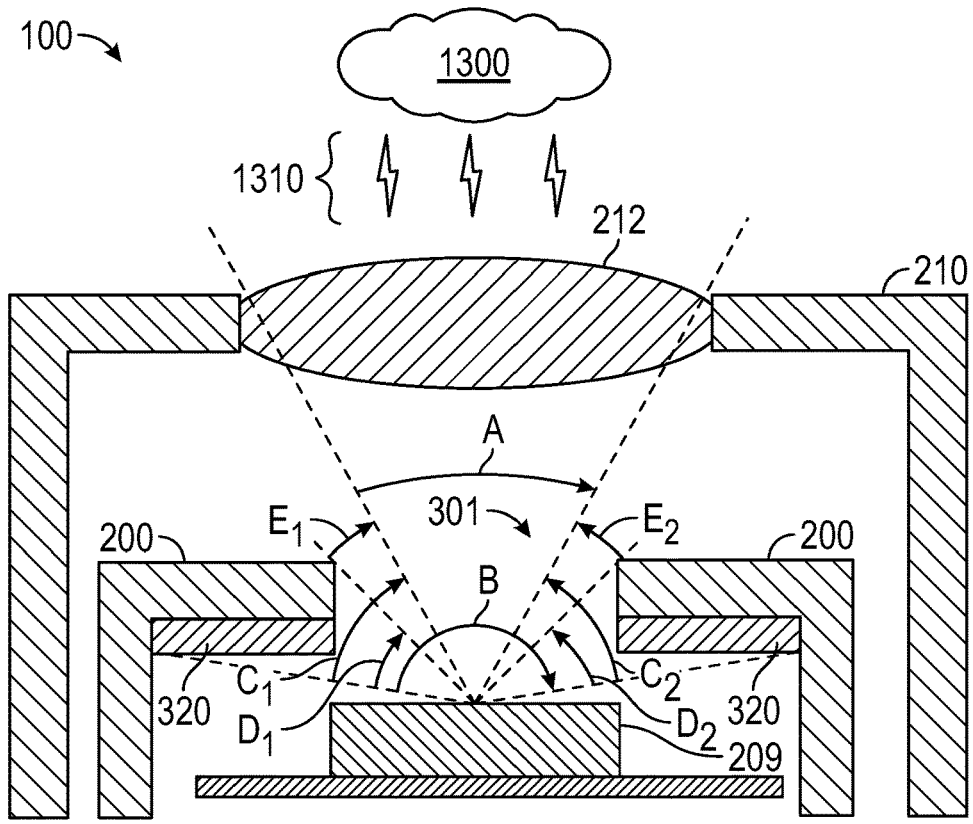
FIG. 13 is a block diagram of an infrared imaging device with a shutter assembly having a low emissive surface positioned in proximity to an array of infrared sensors, according to an embodiment of the present disclosure.

An example of this arrangement is further illustrated in block diagram form in FIG. 13. As shown in FIG. 13, infrared imaging system 100 is positioned to receive infrared radiation 1310 from a scene 1300. Shutter assembly 200 is positioned between lens assembly 210 and FPA 209. Accordingly, infrared radiation 1310 from scene 1300 passes through one or more optical elements 212 of lens assembly 210 and opening 301 in shutter assembly 200, and is received by FPA 209 through an angle A.

As also shown in FIG. 13, FPA 209 may receive infrared radiation through a wide angle B greater than angle A. As such, other non-scene infrared radiation received through the remaining portions of angle B (e.g., corresponding to angles C1 and C2) corresponds to undesirable out-of-field radiation (e.g., non-scene radiation caused by external environmental heating of infrared imaging device 100, internal heating caused by the operation of components of infrared imaging device, and/or other sources). Such out-of-field radiation may cause non-uniformities in the images captured by FPA 209.

As further shown in FIG. 13, shutter assembly 200 is the closest structure to FPA 209 that is within the field of view of angle A. Moreover, shutter assembly 200 subtends over angles D1 and D2 which significantly overlap with the out-of-field angles C1 and C2. Thus, in some embodiments, shutter assembly 200 is the largest likely contributor of undesirable out-of-field radiation that may be received by FPA 209.

Shutter assembly 200 provides surfaces 320 facing FPA 209 that subtend over the same and/or similar angles D1 and D2 which likewise significantly overlap with the out-of-field angles C1 and C2. In various embodiments, surfaces 320 may correspond to an external surface of shutter housing 307, a one or more metal layers (e.g., metalized layers provided by coatings or otherwise) disposed on shutter housing 307, an intermediate component (e.g., a plate or other physical component) disposed between shutter housing 307 and FPA 209, and/or other appropriate structures or materials.

Implementing surfaces 320 as low emissive surfaces significantly reduces or eliminates the out-of-field radiation received by FPA 209 through angles D1 and D2. For example, because shutter assembly 200 is the largest likely contributor of such radiation (e.g., due to its close proximity to FPA 209), reducing its out-of-field radiation contribution will have a significant impact on the overall amount of out-of-field radiation received by FPA 209.

Moreover, as shown in FIG. 13, angles D1 and D2 substantially overlap with the out-of-field angles C1 and C2. As a result, any additional out-of-field radiation received through the non-overlapping portions of angles C1 and C2 (e.g., corresponding to angles E1 and E2) is likely to originate from other sources that are positioned far away from FPA 209 (e.g., lens assembly 210) and would have a much smaller contribution to any non-uniformities detected by FPA 209.

In some embodiments, FPA 209 is positioned in such close proximity to surfaces 320 that the field of view of FPA 209 (e.g., corresponding to angle B) is entirely occupied by angle A (e.g., corresponding to scene-based radiation received through lens assembly 210) and angles D1 and D2 (e.g., corresponding to attenuated out-of-field radiation, if any, received from surfaces 320). For example, in such embodiments, surfaces 320 may subtend further over FPA 209 such that angles C1 and C2 are completely overlapped by angles D1 and D2, and angles E1 and E2 are effectively reduced to zero. As a result, any out-of-field radiation incident on FPA 209 will be attenuated by surfaces 320.

In various embodiments, surfaces 320 may be implemented as one or more metal layers in accordance with the disclosure provided by U.S. Pat. No. 9,473,681 issued Oct. 18, 2016, which is hereby incorporated by reference in its entirety.

The low emissivity of surfaces 320 may reduce the effects of out-of-field radiation received by FPA 209 by reducing the power emitted by various components of infrared imaging device 100 toward FPA 209. In this regard, the power emitted by a surface may be expressed as $W(\lambda,T)*e$, where $\lambda$ is the wavelength of infrared radiation, T is the temperature of the surface, and e is the emissivity of the surface. Thus, the emitted power may be considered a linear function of the emissivity.

Metal such as gold has an emissivity of approximately 0.02, nickel has an emissivity in a range of approximately 0.05 to approximately 0.11, and aluminum has an emissivity in a range of approximately 0.05 to approximately 0.09, all of which may be substantially less than that of certain other components of infrared imaging device 100 that may having an emissivity in a range of approximately 0.8 to approximately 0.95 (e.g., in the case of lens barrel holder 204, lens barrel 208, optical elements 212, other portions of lens assembly 210, shutter housing 200, and/or other components when implemented by plastic or similar material). Accordingly, considering the emissivities discussed above, power emitted from low emissive surfaces 320 may be approximately one tenth of that emitted from other components made of plastic or similar materials when implemented by the various metals noted above.

Thus, with low emissive surfaces 320 present, less out-of-field infrared radiation (e.g., power) is received by FPA 209 in response to temperature changes in the other components (e.g., an approximately 90% reduction in some embodiments). The reduced power emitted by low emissive surfaces 320 in comparison to other components having higher emissivity (e.g., portions of lens assembly 210, shutter assembly 200, and/or other components in some embodiments) results in corresponding smaller output changes experienced by FPA 209 in response to such radiation (e.g., fewer effects of out-of-field radiation will be represented in image frames captured by FPA 209). As a result, FPA 209 may be operated with greater thermographic accuracy, as there is less need to compensate for out-of-field radiation when performing temperature measurements of objects in scene 1300. In addition, the reduced amount of radiation emitted by low emissive surfaces 320 in comparison to other components may result in FPA 209 exhibiting less low spatial frequency non-uniformity. Also, by reducing the radiation received by FPA 209, possible errors in estimating contributions of out-of-field radiation may be correspondingly reduced. As a result, FPA 209 may be operated with improved thermographic accuracy and uniformity.

Low emissive surfaces 320 may be used to improve the thermal conductivity of infrared imaging device 100 and thus reduce additional problems associated with conventional infrared imaging systems. In this regard, conventional systems may experience non-uniform heating (e.g., hot spots) from various components (e.g., mounted inside or outside a housing) and/or various external heat sources. As a result, the temperature distribution across such systems may vary significantly, especially as various components are selectively switched on and off. If left uncorrected, non-uniform heating of a housing may result in low spatial frequency non-uniformities exhibited at the sensors.

Such non-uniform heating effects may be substantially reduced in infrared imaging module device 100 by the high thermal conductivity of low emissive surfaces 320. For example, in some embodiments, portions of lens assembly 210, shutter assembly 200, and/or other components may be implemented with a material (e.g., comprised substantially of plastic and/or other material) having relatively low thermal conductivity (e.g., also a relatively slow thermal time constant). However, by providing low emissive surfaces 320 with a higher thermal conductivity (e.g., also a faster thermal time constant) than the other components, heat may be more uniformly distributed around FPA 209 and thus reduce the detrimental effects of non-uniform heating, especially where infrared imaging device 100 is used in close proximity to other components, such as in personal electronic devices.

In some embodiments, low emissive surfaces 320 may also be used to provide an electromagnetic interference (EMI) shield in a manner that overcomes several problems associated with conventional approaches. In this regard, conventional systems may utilize EMI shields implemented as separate structures that must be positioned over various components for shielding. Such structures occupy valuable space, reduce convective cooling, and involve additional assembly costs, all of which make them poorly suited to small form factor applications.

These drawbacks may be substantially reduced by low emissive surfaces 320. In some embodiments, low emissive surfaces 320 may be grounded and operate as an EMI shield. In particular, low emissive surfaces 320 may operate as a shield to substantially attenuate EMI emitted by FPA 209 (e.g., emitted toward other components and/or the environment and/or received by FPA 209 (e.g., received other components and/or the environment), particularly when paddle 309 is in a closed position. Thus, in contrast to conventional EMI shields, low emissive surfaces 320 effectively provide a compact EMI shield that does not occupy significant additional space within infrared imaging device 100.

Figure 14:
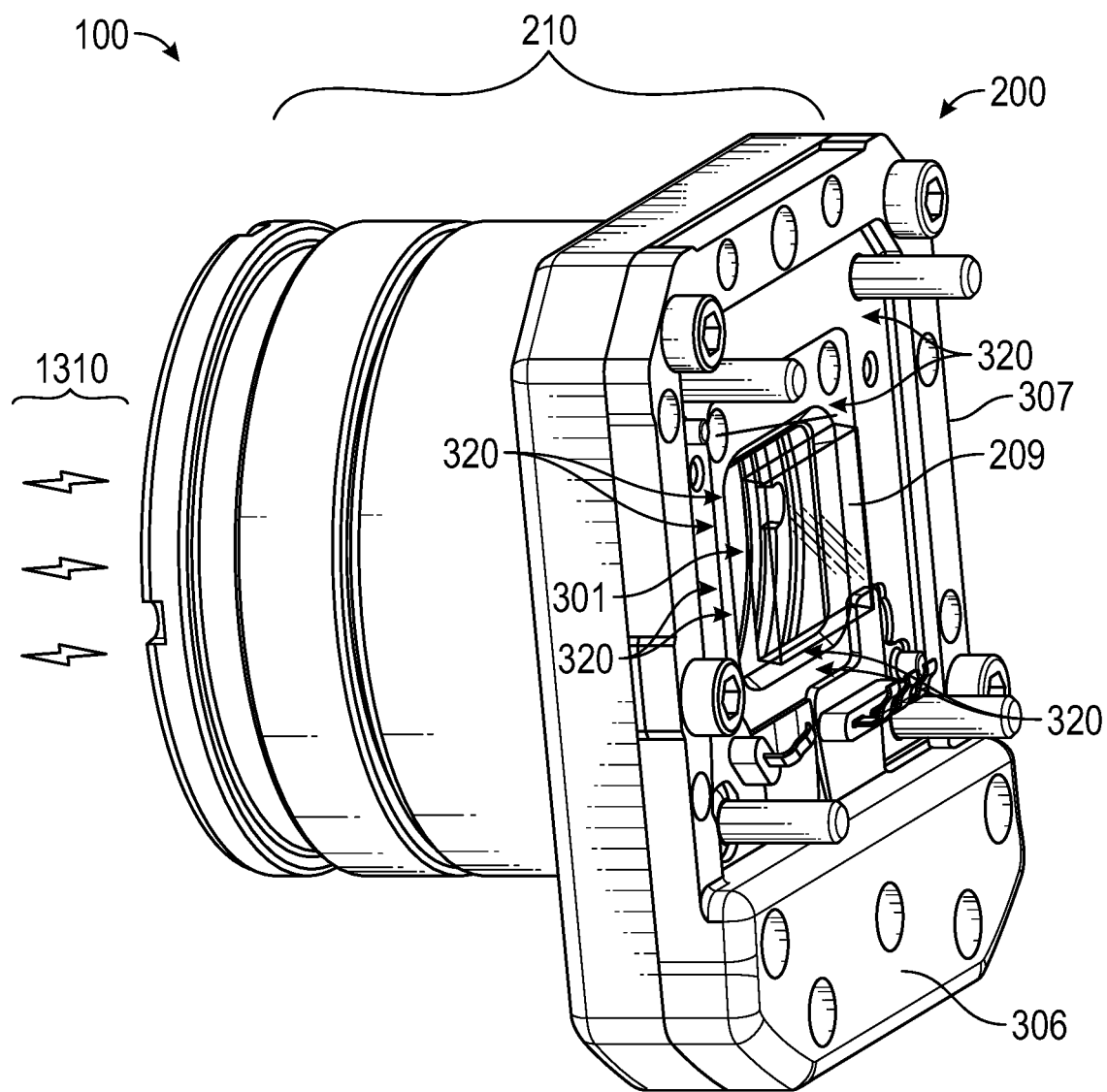
FIG. 14 is a perspective view of a shutter assembly and an infrared sensor assembly having a low emissive surface positioned in proximity to an array of infrared sensors, according to an embodiment of the present disclosure.
Figure 15:
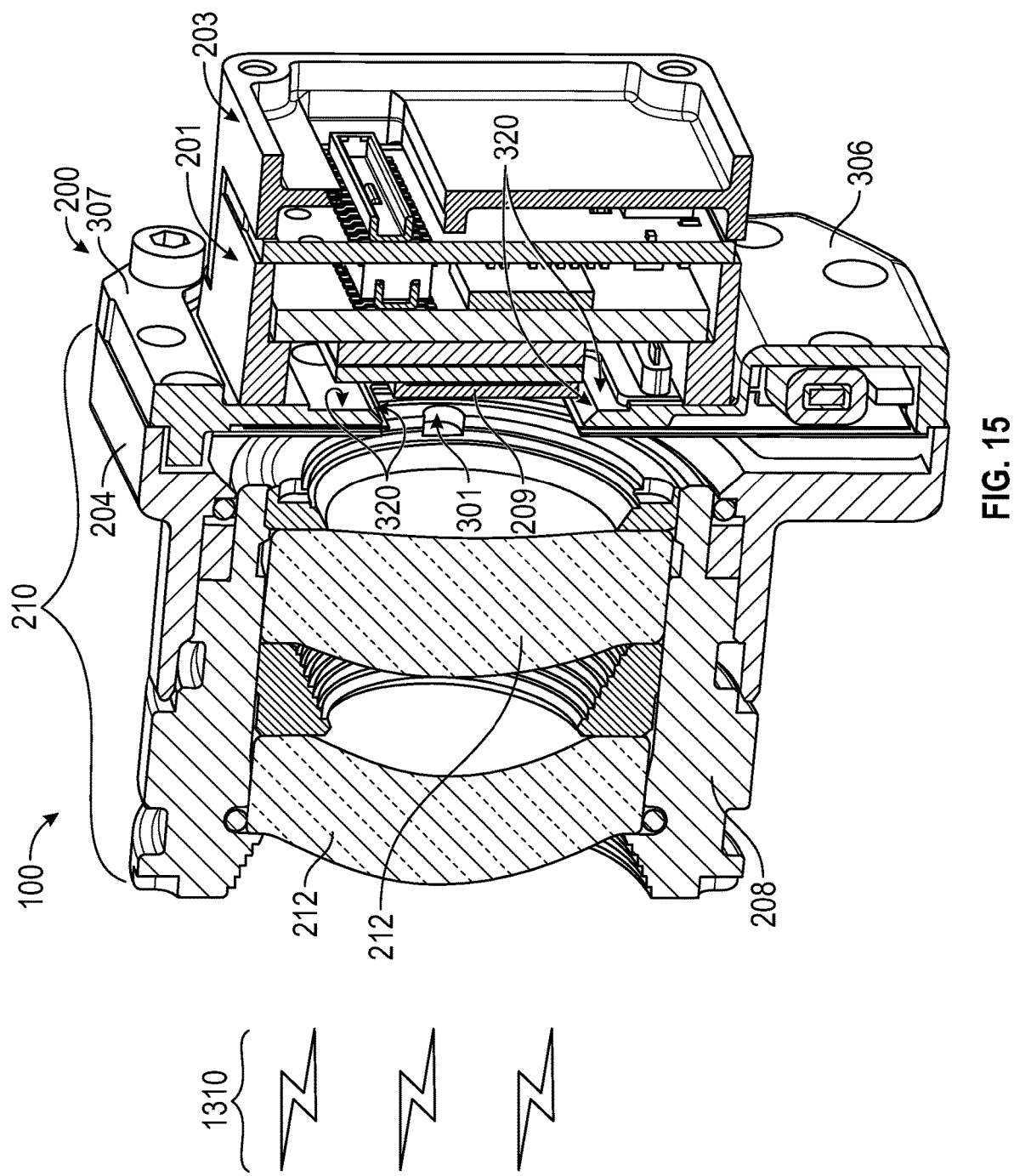
FIG. 15 is a perspective cross-sectional view along the lines 15-15 of FIG. 1, according to an embodiment of the present disclosure.

FIGS. 14 and 15 illustrate examples of low emissive surfaces 320 provided in proximity to FPA 209 for particular implementations of infrared imaging device 100, according to embodiments of the present disclosure. Similarly, FIGS. 16A-B and 17 illustrate additional examples for another configuration of shutter assembly 200 with low emissive surfaces 320 provided on a plate 321 of shutter assembly 200 and alternative embodiments of various components of infrared imaging device 100.

Figure 16A:
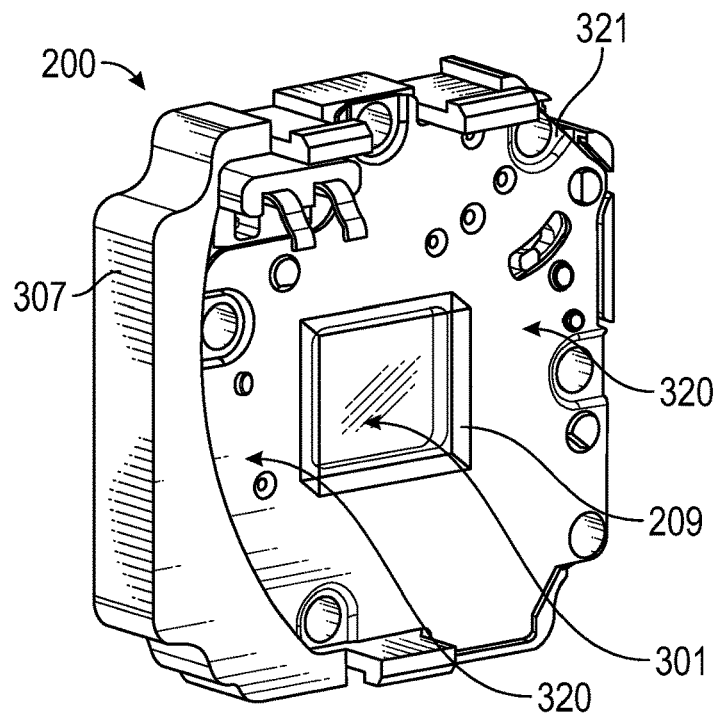
FIGS. 16A-B are perspective views of another implementation of a shutter assembly and an infrared sensor assembly having a low emissive surface positioned in proximity to an array of infrared sensors, according to embodiments of the present disclosure.
Figure 16B:
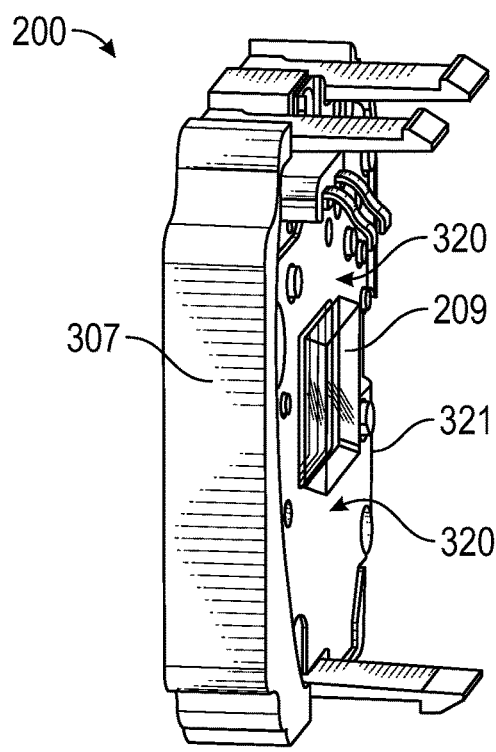
Figure 17:
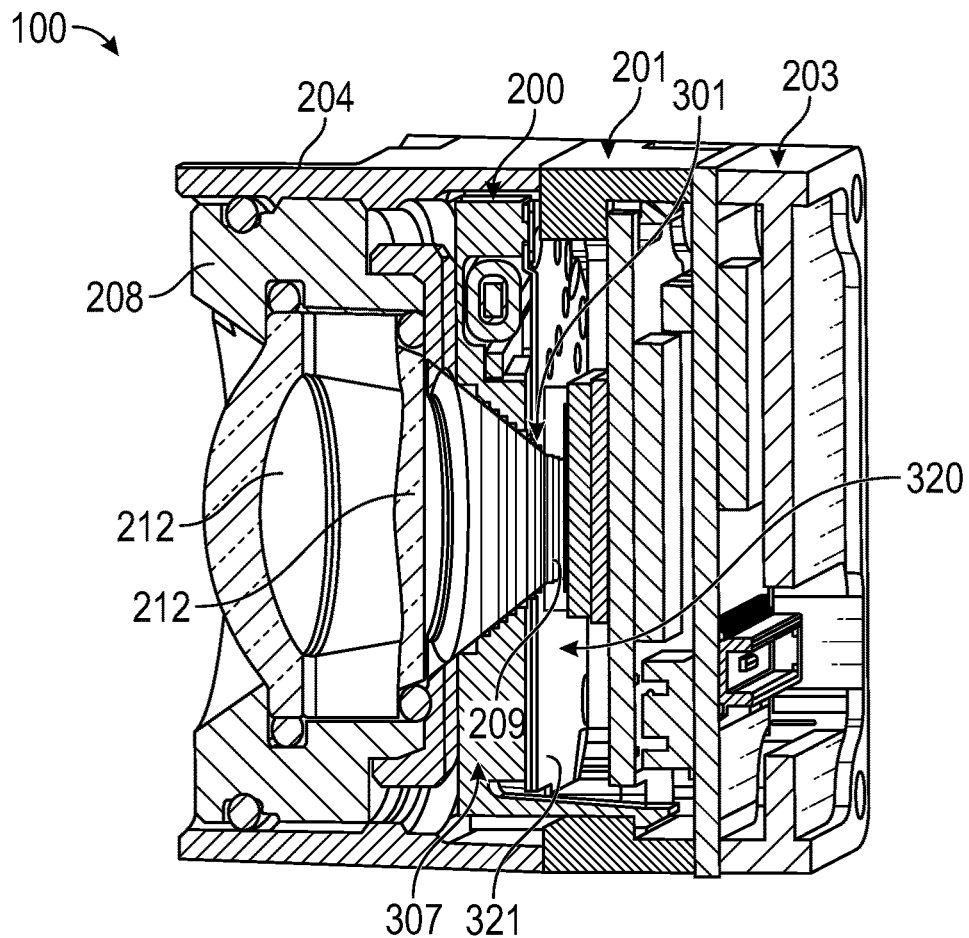
FIG. 17 is a perspective cross-sectional view along the lines 17-17 of FIG. 1 utilizing the shutter assembly of FIGS. 16A-B, according to an embodiment of the present disclosure.

Specifically, FIGS. 14 and 16A-B are perspective views of infrared imaging device 100 with circuit board assembly 202 and housing 203 fully removed. In FIGS. 14 and 16A-B, infrared sensor assembly 201 has been mostly removed, and with FPA 209 of infrared sensor assembly 201 shown in semi-transparent form to further illustrate its position relative to surfaces 320. FIG. 15 is a perspective cross-sectional view of infrared imaging device 100 taken along the lines 15-15 of FIG. 1, according to an embodiment of the present disclosure. FIG. 17 is a perspective cross-sectional view along the lines 17-17 of FIG. 1 utilizing the shutter assembly of FIGS. 16A-B, according to an embodiment of the present disclosure.

In each of FIGS. 14 to 17, FPA 209 is positioned to receive scene-based infrared radiation 1310 passing through optical elements 212 of lens assembly 210 and opening 301 in shutter assembly 200. However, as similarly discussed with regard to FIG. 13, FPA 209 may be susceptible to receiving out-of-field radiation from other sources. As shown in FIGS. 14 to 17, FPA 209 is positioned adjacent to shutter assembly 200. Indeed, in the illustrated embodiments, shutter assembly 200 is the closest component of infrared imaging device 100 to the receiving side of FPA 209. Accordingly, in some embodiments, shutter assembly 200 may be the greatest possible source of out-of-field radiation that may be received by FPA 209.

To substantially reduce or eliminate such out-of-field radiation, shutter assembly 200 includes low emissive surfaces 320 as discussed. Accordingly, FPA 209 will be effectively shielded from all or most out-of-field infrared radiation, thus reducing unintended non-uniformities in the images captured by FPA 209.

Figure 18:
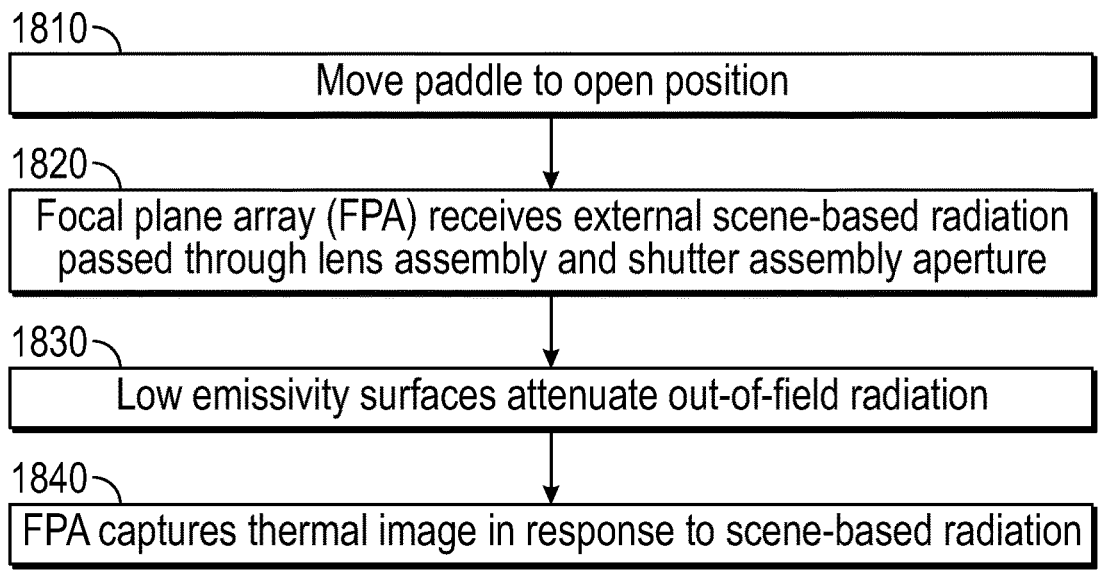
FIG. 18 is a flow chart of a process of operating an infrared imaging device with low emissive surfaces provided in proximity to infrared sensors, according to an embodiment of the present disclosure.

FIG. 18 is a flow chart of a process of operating infrared imaging device 100 with low emissive surfaces provided in proximity to FPA 209, according to an embodiment of the present disclosure. Although various blocks of FIG. 18 are illustrated and described separately, this is only for ease of explanation to the reader. In this regard, any or all of the blocks may be performed simultaneously during the operation of infrared imaging device 100.

In block 1810, paddle 309 is at the initial open position (e.g., stowed position), or if it is in any other position (e.g., closed position) the paddle 309 is moved to the open position (e.g., by controller 500) such that it is maintained within shutter housing 307 of shutter assembly 200 (e.g., as similarly discussed with regard to block 602 of FIG. 11).

In block 1820, infrared radiation 1310 from scene 1300 passes through one or more optical elements 212 of lens assembly 210 and opening 301 in shutter assembly 200, and is received by FPA 209 through angle A as discussed.

In block 1830, low emissive surfaces 320 attenuate (e.g., partially reduce or completely block) out-of-field infrared radiation received by FPA 209 (e.g., attenuating radiation received through angles D1 and D2 as shown in FIG. 13).

In block 1840, FPA 209 captures one or more thermal images in response to scene-based infrared radiation 1310. Because out-of-field infrared radiation is attenuated by low emissive surfaces 320, the captured thermal images will exhibit reduced non-uniformities associated with undesirable out-of-field radiation. As a result, the quality of the captured thermal images can be significantly improved.

Additional embodiments are also contemplated. In one embodiment, a system comprises: a plurality of infrared sensors implemented in a focal plane array (FPA) configured to capture thermal images in response to scene-based thermal radiation received over a first angle and out-of-field thermal radiation received over a second angle; a shutter assembly comprising an opening configured to pass the scene-based thermal radiation to the FPA, wherein the shutter assembly subtends over at least a portion of the second angle; and a surface disposed between the FPA and the shutter assembly configured to attenuate the out-of-field thermal radiation received by the FPA through the subtended portion of the second angle.

In another embodiment, a method comprises: passing, through an opening in a shutter assembly, scene-based thermal radiation to a plurality of infrared sensors implemented in a focal plane array (FPA); attenuating, by a surface disposed between the FPA and the shutter assembly, out-of-field thermal radiation; capturing, by the FPA, thermal images in response to the scene-based thermal radiation received over a first angle and the attenuated out-of-field thermal radiation received over a second angle; wherein the shutter assembly subtends over at least a portion of the second angle; and wherein the surface attenuates the out-of-field thermal radiation received by the FPA through the subtended portion of the second angle.

In another embodiment, the surface is a metal surface of the shutter assembly. In another embodiment, the surface is a metalized layer disposed on the shutter assembly. In another embodiment, the surface is a surface of an intermediate physical component. In another embodiment, the surface is a low emissive surface having an emissivity in a range of approximately 0.02 to approximately 0.11.

In another embodiment, a lens barrel holder is configured to selectively attach a lens barrel to position the lens barrel between the shutter assembly and an imaged scene. In another embodiment, the lens barrel has an emissivity greater than the surface.

In another embodiment, the attenuation of the out-of-field thermal radiation by the surface reduces non-uniformities in the captured thermal images. In another embodiment, the FPA is positioned in proximity to the surface such that the surface subtends over an entirety of the second angle. In another embodiment, the system is a thermal imaging camera. In another embodiment, the method is performed by a thermal imaging camera.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A device comprising:
   a focal plane array (FPA) configured to capture thermal images of a target scene; and
   a shutter assembly comprising:
      a paddle configured to move between an open position and a closed position, the paddle being configured to block scene-based infrared radiation from reaching the FPA in a closed position and pass the scene-based infrared radiation to the FPA in an open position;
      a thermistor embedded within the shutter assembly and configured to sense a temperature of the paddle when the paddle is in the open position;
      a low emissive surface adjacent to, substantially parallel with, and facing the FPA and configured to attenuate out-of-field thermal radiation while the FPA captures the scene-based thermal radiation; and
   wherein the shutter assembly is configured to interface with a lens assembly disposed between the shutter assembly and the target scene.

2. The device of claim 1, further comprising:
   an infrared sensor assembly comprising:
      the FPA, and
      a first set of electrical contacts; and
   wherein the shutter assembly further comprises a second set of electrical contacts electrically coupled with the thermistor through a conductive path and mechanically engaged with the first set of electrical contacts.

3. The device of claim 2, wherein the temperature sensed by the thermistor is provided as a voltage based on a resistance value of the thermistor to the infrared sensor assembly through the first and second sets of electrical contacts.

4. The device of claim 2, wherein the first and second sets of electrical contacts are complementary with each other.

5. The device of claim 4, wherein one of the first or the second set of electrical contacts are conductive pads and the other one of the first or the second set of electrical contacts are spring contacts engaged with the conductive pads.

6. The device of claim 1, wherein the paddle is further configured to rotate about an axis between the open position and the closed position.

7. The device of claim 2, wherein:
   the thermistor is disposed at a first side of the shutter assembly;
   the second set of electrical contacts are disposed at a second side of the shutter assembly;
   the shutter assembly further comprises an inner plate and an outer plate at the first side of the shutter assembly, the paddle being disposed between the inner plate and the outer plate such that the paddle is configured to slide between the inner plate and the outer plate to move from the open position to the closed position; and
   the paddle is configured to be at a same temperature as the inner plate through heat transfer between the paddle and the inner plate.

8. The device of claim 7, further comprising the lens assembly configured to pass the scene-based infrared radiation from the target scene to the FPA, the lens assembly connected to the shutter assembly at a side opposite the infrared sensor assembly, the paddle being disposed between the thermistor and the lens assembly.

9. The device of claim 2, wherein:
   the infrared sensor assembly further comprises a third set of mechanically engageable electrical contacts; and
   the shutter assembly further comprises:
      a fourth set of mechanically engageable electrical contacts complementary with the third set of electrical contacts, and
      an actuator configured to move the paddle between the open position and the closed position in response to a voltage provided through the third and fourth sets of electrical contacts.

10. The system of claim 1, further comprising:
    the FPA comprising a plurality of infrared sensors configured to capture the thermal images in response to the scene-based thermal radiation received over a first angle and out-of-field thermal radiation received over a second angle;
    wherein the shutter assembly comprises an opening configured to pass the scene-based thermal radiation to the FPA while the paddle is in the open position, wherein the shutter assembly subtends over at least a portion of the second angle; and
    wherein the low emissive surface is configured to attenuate the out-of-field thermal radiation received by the FPA through the subtended portion of the second angle.

11. The system of claim 1, further comprising a lens barrel holder comprising snap-on clips configured to selectively attach a lens barrel to position the lens barrel between the shutter assembly and an imaged scene.

12. A method comprising:
providing a paddle in a shutter assembly connected to an infrared sensor assembly, wherein the paddle is configured to move between a closed position blocking scene-based infrared radiation from reaching a focal plane array (FPA) of the infrared sensor assembly configured to capture thermal images of a target scene, and an open position passing the scene-based infrared radiation to the FPA;
sensing a temperature of the paddle in the open position by a thermistor embedded within the shutter assembly;
determining the temperature of the paddle based on voltage values of the thermistor based on resistance values of the thermistor corresponding to the temperature sensed by the thermistor;
attenuating, by a low emissive surface of the shutter assembly adjacent to, substantially parallel with, and facing the FPA, out-of-field thermal radiation while the FPA captures the scene-based thermal radiation; and
wherein the shutter assembly is configured to interface with a lens assembly disposed between the shutter assembly and the target scene.

13. The method of claim 12, wherein:
the infrared sensor assembly comprises a first set of mechanically engageable contacts; and
the shutter assembly comprises a second set of mechanically engageable electrical contacts electrically coupled with the thermistor through a conductive path and mechanically engaged with the first set of electrical contacts.

14. The method of claim 13, further comprising coupling the shutter assembly with the infrared sensor assembly by the first and second sets of electrical contacts.

15. The method of claim 13, wherein the first and second sets of electrical contacts are complementary with each other.

16. The method of claim 15, wherein one of the first or the second set of electrical contacts are conductive pads and the other one of the first or the second set of electrical contacts are spring contacts engaged with the conductive pads.

17. The method of claim 13, wherein:
the thermistor is disposed at a first side of the shutter assembly;
the second set of electrical contacts are disposed at a second side of the shutter assembly;
the paddle is disposed between an inner plate and an outer plate of the shutter assembly;
the paddle, the inner plate, and the outer plate are disposed between the thermistor and a lens assembly; and
the method further comprises:
sliding the paddle between the inner plate and the outer plate to move from the open position to the closed position, and
maintaining a temperature of the inner plate at a same temperature as the paddle through heat transfer between the inner plate and the paddle.

18. The method of claim 12, wherein:
the infrared sensor assembly further comprises a third set of mechanically engageable electrical contacts;
the shutter assembly further comprises a fourth set of mechanically engageable electrical contacts complementary with the third set of electrical contacts; and
the method further comprises:
coupling the third set of electrical contacts with the fourth set of electrical contacts, and
rotating the paddle between the open position and the closed position in response to a voltage provided to an actuator of the shutter assembly through the third and fourth sets of the mechanically engageable electrical contacts.

19. The method of claim 12, further comprising:
passing, through an opening in the shutter assembly, the scene-based thermal radiation;
capturing, by the FPA, the thermal images in response to the scene-based thermal radiation received over a first angle and the out-of-field thermal radiation received over a second angle;
wherein the shutter assembly subtends over at least a portion of the second angle; and
wherein the surface attenuates the out-of-field thermal radiation received by the FPA through the subtended portion of the second angle.

20. The method of claim 12, further comprising providing a lens barrel holder comprising snap-on clips configured to selectively attach a lens barrel to position the lens barrel between the shutter assembly and an imaged scene.

* * * * *

UNITED STATES PATENT AND TRADEMARK OFFICE
CERTIFICATE OF CORRECTION

PATENT NO. : 10,996,542 B2
APPLICATION NO. : 16/511365
DATED : May 4, 2021
INVENTOR(S) : Joseph Kostrzewa et al.

Page 1 of 1

It is certified that error appears in the above-identified patent and that said Letters Patent is hereby corrected as shown below:

On the Title Page

Item [54] and in the Specification Column 1, Line 3 change "THERMISTER" to --THERMISTOR--.

In the Specification

In the Cross-Reference to Related Applications:

In Column 1, Lines 27-28 change "patent application Ser. No." to --Patent Application No.--.

In Column 1, Line 32 change "patent application Ser. No." to --Patent Application No.--.

In Column 1, Lines 42-43 change "patent application Ser. No." to --Patent Application No.--.

In Column 1, Line 48 change "patent application Ser. No." to --Patent Application No.--.

In Column 1, Line 49 change "patent application Ser. No." to --Patent Application No.--.

In the Detailed Description:

In Column 6, Line 54 change "patent application Ser. No." to --Patent Application No.--.

In Column 6, Lines 60-61 change "patent application Ser. No." to --Patent Application No.--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*